United States Patent
Hayashi

[11] Patent Number: 5,962,833
[45] Date of Patent: Oct. 5, 1999

[54] VEHICLE-MOUNTED APPARATUS FOR ROAD-TO-VEHICLE COMMUNICATIONS AND ROAD-TO-VEHICLE COMMUNICATION SYSTEM

[75] Inventor: Hironao Hayashi, Gifu-ken, Japan

[73] Assignee: Toyota Jidosha Kabushiki Kaisha, Toyota, Japan

[21] Appl. No.: 08/742,876

[22] Filed: Nov. 1, 1996

[30] Foreign Application Priority Data

Nov. 2, 1995 [JP] Japan .................................. 7-285959

[51] Int. Cl.⁶ ........................... G06K 15/02; G06F 15/00
[52] U.S. Cl. ..................... 235/384; 235/375; 235/380; 340/928; 340/933
[58] Field of Search .................. 235/375, 380, 235/382, 384; 340/928, 933

[56] References Cited

U.S. PATENT DOCUMENTS

| | | | |
|---|---|---|---|
| 4,555,618 | 11/1985 | Riskin | 235/384 |
| 4,930,129 | 5/1990 | Takahira | 235/380 |
| 4,963,723 | 10/1990 | Masada | 235/384 |
| 5,038,025 | 8/1991 | Kodera | 235/492 |
| 5,111,030 | 5/1992 | Brasington et al. | 235/375 |
| 5,144,553 | 9/1992 | Hassett et al. | 235/384 |
| 5,172,321 | 12/1992 | Ghaem et al. | 364/444 |
| 5,204,675 | 4/1993 | Sekine | 235/380 |
| 5,310,999 | 5/1994 | Claus et al. | 235/384 |
| 5,422,473 | 6/1995 | Kamata | 235/384 |
| 5,440,109 | 8/1995 | Hering et al. | 235/384 |
| 5,459,304 | 10/1995 | Eisenmann | 235/380 |
| 5,521,363 | 5/1996 | Tannenbaum | 235/379 |
| 5,525,991 | 6/1996 | Nagura et al. | 235/384 |
| 5,581,249 | 12/1996 | Yoshida | 340/928 |
| 5,602,919 | 2/1997 | Hurta et al. | 235/384 |
| 5,675,494 | 10/1997 | Sakurai et al. | 364/464.27 |
| 5,705,996 | 1/1998 | Eguchi | 340/928 |
| 5,751,227 | 5/1998 | Yoshida et al. | 340/928 |

FOREIGN PATENT DOCUMENTS

| | | | |
|---|---|---|---|
| 43 38 556 | 5/1995 | Germany . | |
| 2183389 | 7/1990 | Japan | 235/384 |
| 5-100018 | 4/1993 | Japan . | |
| 07769763 | 10/1995 | Japan | 235/384 |
| 8-16848 | 1/1996 | Japan . | |

OTHER PUBLICATIONS

Patent Abstracts of Japan vol. 095, No. 003, Apr. 28, 1995 & JP 06 348988 A (Mazda Motor Corp) Dec. 22, 1994.

*Primary Examiner*—Michael G. Lee
*Assistant Examiner*—Daniel St. Cyr
*Attorney, Agent, or Firm*—Pillsbury Madison & Sutro LLP

[57] ABSTRACT

A road-to-vehicle communication system capable of avoiding an increase in the size of each of vehicle-mounted apparatuses and easily confirming the contents of data stored in each vehicle-mounted apparatus on the on-road apparatus side when the transfer of information therebetween by radio communications is disabled. Except when communications are made between the on-road apparatus and the vehicle-mounted apparatus, it is judged whether data about the communications between the on-road apparatus and the vehicle-mounted apparatus should be written into an IC card according to write conditions. When the present state of a vehicle coincides with one of the write conditions, data stored in the vehicle-mounted apparatus is written into the IC card together with the present time on the vehicle-mounted apparatus side. Thus, the data stored in the vehicle-mounted apparatus can be transferred to the on-road apparatus together with time information indicative of the time at which the data has been written into the IC card. Whether the data stored in the IC card has been accurately written from the vehicle-mounted apparatus can be confirmed on the on-road apparatus side by reading the data in the IC card and the time information referred to above.

3 Claims, 15 Drawing Sheets

F I G. 1
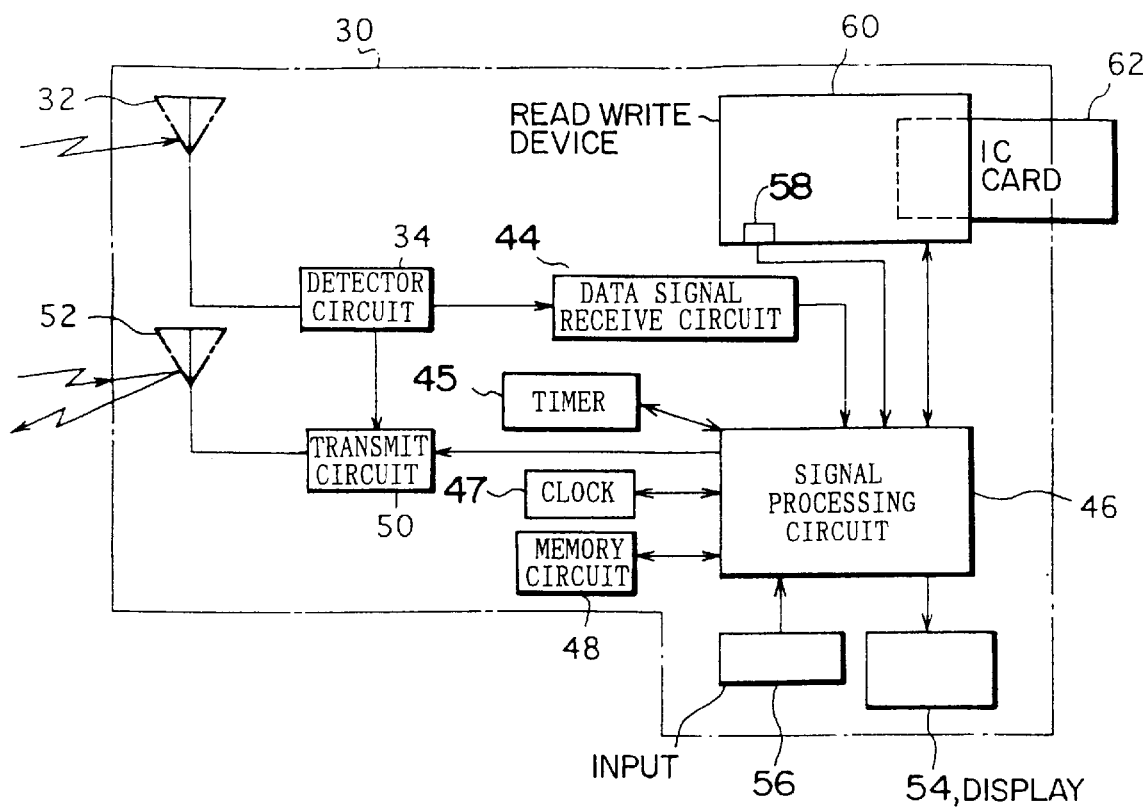

F I G. 1 4
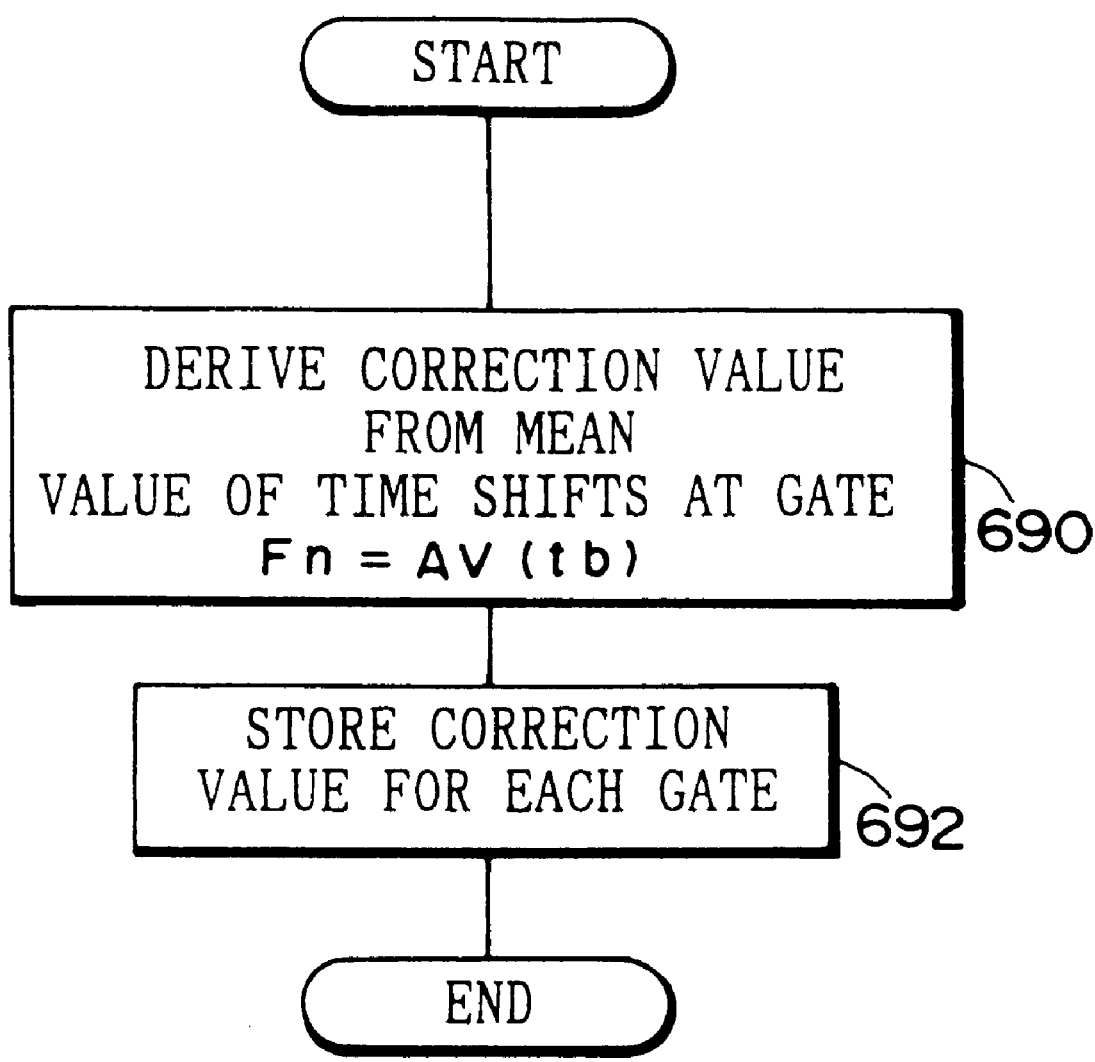

VEHICLE-MOUNTED APPARATUS FOR ROAD-TO-VEHICLE COMMUNICATIONS AND ROAD-TO-VEHICLE COMMUNICATION SYSTEM

BACKGROUND OF THE INVENTION

1. Field of the Invention

The present invention relates to a vehicle-mounted apparatus suitable for use in road-to-vehicle communications, and particularly, for communicating with each of apparatuses installed on a road to automatically receive a toll on a toll road such as a highway or the like and to a road-to-vehicle communication system comprising on-road apparatuses and a vehicle-mounted apparatus for road-to-vehicle communications.

2. Description of the Related Art

In recent years, an automatic toll collecting or receiving system has been developed which utilizes a toll pre-paid type card or a toll post-paid type card to receive charges for using charged facilities, e.g., receive a traffic toll charged on a toll road. In the automatic toll receiving system, on-road apparatuses with antennas, each of which serves as an interrogator for inquiring a vehicle information to automatically receive tolls at entrance and exit gates in the toll road are provided on the road side and each of vehicle-mounted apparatuses for road-to-vehicle communications (hereinafter called "vehicle-mounted apparatuses") with antennas, which serves as a responder for responding to the inquired information, is mounted on the vehicle, whereby the information is transferred between the vehicle-mounted apparatus and the on-road apparatus by radio communications.

However, there may be cases in which due to a failure in maintenance of an on-road apparatus, the shortage of power of a vehicle-mounted battery, a failure in operation of an antenna, etc., the on-road apparatus cannot receive the information stored in the vehicle-mounted apparatus and the vehicle-mounted apparatus cannot receive the information sent from the on-road apparatus. Further, there may be also cases where since route information indicative of through which route the vehicle has passed, cannot be received on the on-road apparatus side when the vehicle-mounted apparatus malfunctions within the toll road, it becomes impossible to cope with such inconvenience.

A prior art reference is known in which when it is not possible to receive the information stored in the vehicle-mounted apparatus In this way, a connector of each on-road apparatus is directly connected to a connector of the vehicle-mounted apparatus to thereby read the information (see Japanese Patent Application Laid-Open No. 5(1993)-100018).

However, the prior art is accompanied by a problem that since the connector for transmitting and receiving the information must be provided in the vehicle-mounted apparatus, the vehicle-mounted apparatus increases in size. Further, the prior art involves a cumbersome operation in which a road-side connector for communicating with the on-road apparatus is connected to the connector of the vehicle-mounted apparatus to transfer the information between the two apparatuses when it is difficult to transfer the information therebetween by the radio communications. Thus, an excessive burden is imposed on a vehicle occupant or an operator on the on-road apparatus side.

SUMMARY OF THE INVENTION

In view of the foregoing problems, it is an object of the present invention to provide a vehicle-mounted apparatus for road-to-vehicle communications, which is capable of avoiding an increase in the size of the vehicle-mounted apparatus and easily confirms the contents of data stored in the vehicle-mounted apparatus on the on-road apparatus side, and a road-to-vehicle communication system comprising the on-road apparatus and the vehicle-mounted apparatus for the road-to-vehicle communications.

In the vehicle-mounted apparatus for the road-to-vehicle communications, according to a first aspect of the present invention, shows FIG. 15, a determining means which makes a decision as to whether the present state of a vehicle is included in predetermined write conditions indicative of states for requiring writing of the data into an information recording card having a storage area for storing at least the data therein. When the present state is found to be included in the write conditions, a processing means executes a process for reading data stored in a memory means and writing the same into the storage area of the information recording card, and reading the present time counted by a clock means and writing the same into the storage area of the information recording card as time information.

Thus, the contents of the data stored in the vehicle-mounted apparatus can be easily confirmed on the on-road apparatus side by reading the data recorded in the information recording card. Further, the timing with which the data has been recorded therein can be easily confirmed by reading the time information recorded in the information recording card.

Since the data and the time information are both recorded in the information recording card, the transfer of the data between the vehicle-mounted apparatus and the on-road apparatus can be simply done without making a direct connection between the vehicle-mounted apparatus and the on-road apparatus. Further, the reliability of the data can be enhanced based on the time information.

In the road-to-vehicle communication system according to a second aspect of the present invention, as shown in FIG. 15, the data and the time information are read from the information recording card with the data and the time information recorded therein by a read means. A compare means compares the read time information with the present time counted by a time means. When a time difference indicative of the result of comparison by the compare means falls within a predetermined value, a control means executes a toll receiving process, based on the read data.

Since the data and the time information are both read from the information recording card by the read means in this way, the transfer of the data between the vehicle-mounted apparatus and the on-road apparatus can be simply conducted without the two being directly connected to each other. Further, since the present time (counted on the on-road apparatus side is compared with the time at which the data has been recorded in the information recording card and the toll receiving process is done when the time difference falls within the predetermined value, the toll receiving process can be executed based on the latest data.

In the vehicle-mounted apparatus for the road-to-vehicle communications, according to a third aspect of the present invention, a time information correcting means can be provided which corrects the present time of the clock means so as to coincide with the present time of the on-road apparatus, which has been read through the radio communications. If done in this way, the difference between the two present times can be controlled or suppressed between the on-road apparatus and the vehicle-mounted apparatus. Accordingly, the reliability for making a decision about the timing of data from the read time information can be improved.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 1 is a block diagram showing a vehicle-mounted apparatus to which the present invention is applicable;

FIG. 9 is a flowchart for describing a process routine related to an IC card read/write device such as a manned gate or the like;

FIG. 14 is a flowchart for describing a shift correcting process routine; and

DETAILED DESCRIPTION OF THE PREFERRED EMBODIMENTS

Preferred embodiments of the present invention will hereinafter be described in detail with reference to the accompanying drawings. The present embodiment shows to an automatic toll receiving system for automatically receiving a toll from each of the vehicles which run on a toll road or the like. In the automatic toll collecting or receiving system, information is transferred between an apparatus mounted on a vehicle and an on-road apparatus having flat antennas provided at ground portions such as an entrance gate, an exit gate, etc. through radio communications to thereby determine a traffic section (route) over which the vehicle has been driven and the type of vehicle and automatically accept a traffic toll or the like without stopping the vehicle at the entrance and exit gates.

Figure 2:
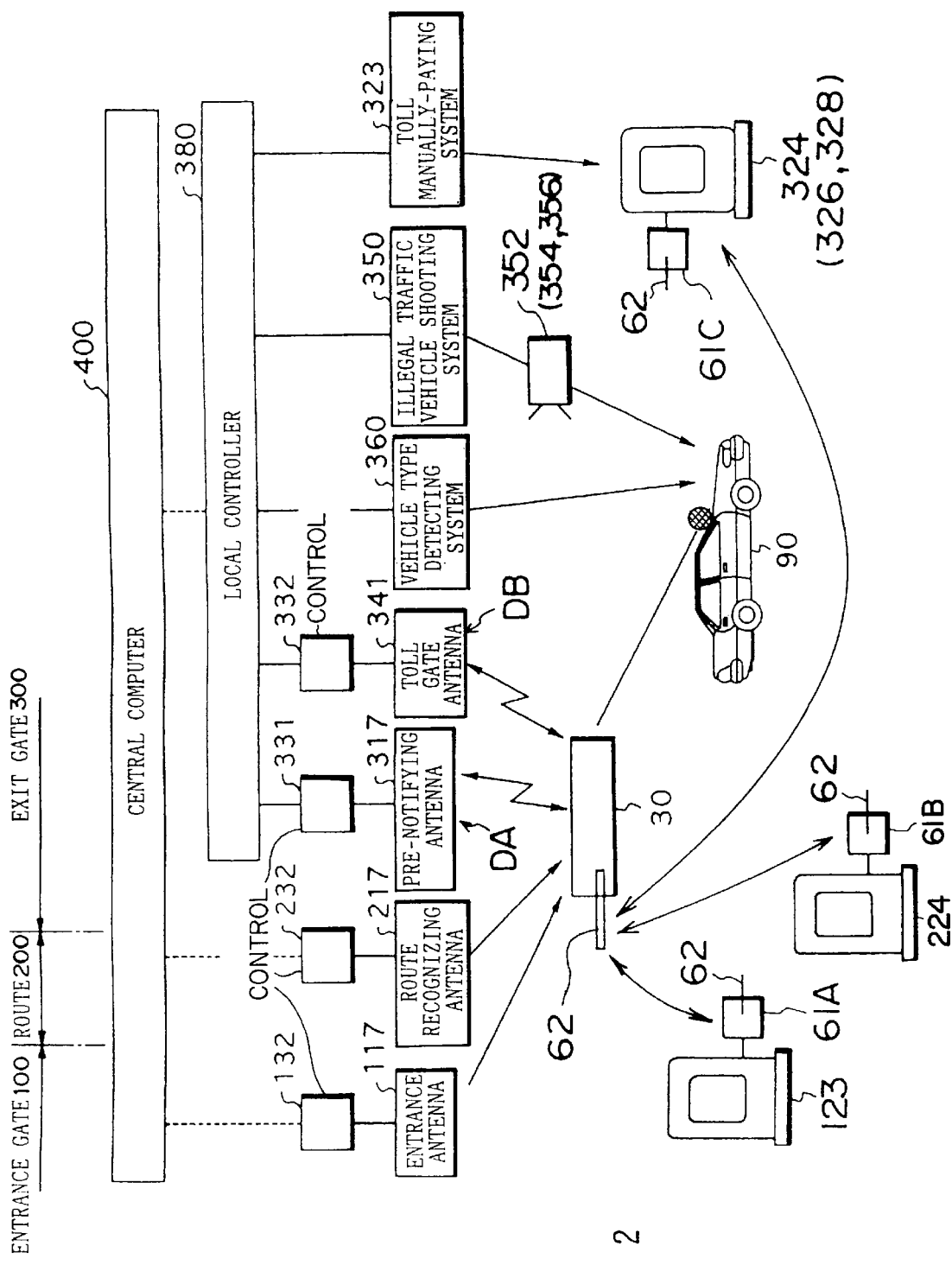
FIG. 2 is a block diagram showing an automatic toll receiving system to which the present invention is applicable.

As shown in FIG. 2, an IC card read/write device from which an IC card 62 is detachable, is installed on an apparatus 30 mounted on a vehicle 90.

A general pre-paid card and a general post-paid card are used as the IC card. A card number, balance information, information about utilization details (entrance gate number, exit gate number, toll, date of application, etc.), information about the time at which information is stored in the pre-paid card, and information about the type of card can be stored in the pre-paid card. On the other hand, a card number, information about utilization details, information about the time at which information is stored in the post-paid card, and information about the type of card can be stored in the post-paid card. A certified key code for associating a card with a vehicle-mounted apparatus has been stored in the general cards.

In addition to the general cards referred to above, a card such as a memory card such as an LSI card or the like, a magnetic card, a hologram card capable of optically recording information therein and reproducing it therefrom, or a magneto-optic card or the like capable of magneto-optically recording information therein and reproducing it therefrom, may be used as the IC card.

On the other hand, the on-road apparatus has flat antennas for transmitting various information to the vehicle-mounted apparatus 30 and receiving the same therefrom. The on-road apparatus is disposed in each of an entrance gate 100 of a toll road, a path or route (check barrier) 200 set in the course thereof and an exit gate 300.

An entrance antenna 117 composed of a flat antenna is disposed in the entrance gate 100 and an entrance antenna control device 132 is electrically connected to the entrance antenna 117. The entrance antenna control device 132 transmits information about the entrance gate of the toll road to the vehicle-mounted apparatus 30 through the entrance antenna 117. A device 123 for issuing a traffic ticket is disposed in the entrance gate 100 to provide an automatically toll-unreceivable vehicle which pays a toll by hand, with convenience. Although the traffic ticket issuing device 123 will be described in detail later, the traffic ticket issuing device 123 also serves as a recovery gate for writing data about entrance information or the like indicative of an entrance gate into an IC card and reading out data stored in the vehicle-mounted apparatus when a communication error arises. The traffic ticket issuing device 123 is provided with an IC card read/write device 61A with which an IC card 62 is detachably engageable. The IC card read/write device 61A is electrically connected to a central computer 400. Further, the entrance antenna control device 132 can be electrically connected to the central computer 400 to generally control or manage each vehicle which enters into the toll road, for example.

A route recognizing antenna 217 composed of a flat antenna is disposed in the mid-route 200. A route recognizing antenna control device 232 is electrically connected to the route recognizing antenna 217. The route recognizing antenna control device 232 transmits route-passage information indicative of through which route the vehicle has run on the toll road, to the vehicle-mounted apparatus 30 through the route recognizing antenna 217. Further, the route recognizing antenna control device 232 can be electrically connected to the central computer 400 to generally control or manage a state of the vehicle being running on the toll road, for example. A recovery gate 224 for writing route information indicative of a mid-route into the vehicle-mounted apparatus by using the IC card 62 when a communication error such as a failure in radio communication occurs in the mid-route 200, is provided. An IC card read/write device 61B from which an IC card 62 is detachable, is disposed in the recovery gate 224. The IC card read/write device 61B is electrically connected to the central computer 400. The recovery gate 224 may be placed in a parking or a service area or the like.

Codes such as numbers or the like respectively assigned to positions of toll roads in advance may be used as the entrance information and route information referred to above.

A pre-notifying antenna 317 and a toll gate antenna 341 each composed of a flat antenna are disposed in the exit gate 300 to increase the reliability of transmission and reception of information by radio. A pre-notifying antenna control device 331 is electrically connected to the pre-notifying antenna 317 and a toll gate antenna control device 332 is electrically connected to the toll gate antenna 341. Further, the pre-notifying antenna control device 331 and the toll gate antenna control device 332 are electrically connected to a local controller 380 which is connectable to the central computer 400. The local controller 380 includes a microcomputer and stores therein a process program for (controlling the pre-notifying antenna control device 331 and the toll gate antenna control device 332 or the tike. Although the pre-notifying antenna 317, the toll gate antenna 341, the pre-notifying antenna control device 331 and the toll gate antenna control device 332 serve as the on-road apparatus according to the present invention, the pre-notifying antenna 317 and the pre-notifying antenna control device 331 may be omitted.

Further, a system 360 for detecting the type of vehicle by an image process or the like, an illegal traffic vehicle shooting system 350 connected with a camera 352 for photographing or shooting an illegal traffic vehicle such as a vehicle which passes through the exit gate 300 in a toll-unpaid state, and a toll manually-paying system 323 provided for vehicles from which tolls cannot be automatically accepted, are disposed in the exit gate 300. By collectively controlling these systems with the local controller 380, steps to cope with the impossibility of toll reception or the like are taken and traffic charges or tolls corresponding to the travelling section (route) of of the vehicle or the type of vehicle are automatically received. Further, the connection of the central computer 400 to the local controller 380 can provide smooth and rapid transmission and reception of information about a change in toll table and information about illegal traffic vehicles.

Examples of respective schematic configurations of the entrance gate, mid-route and exit gate will now be described in further detail.

Figure 3:
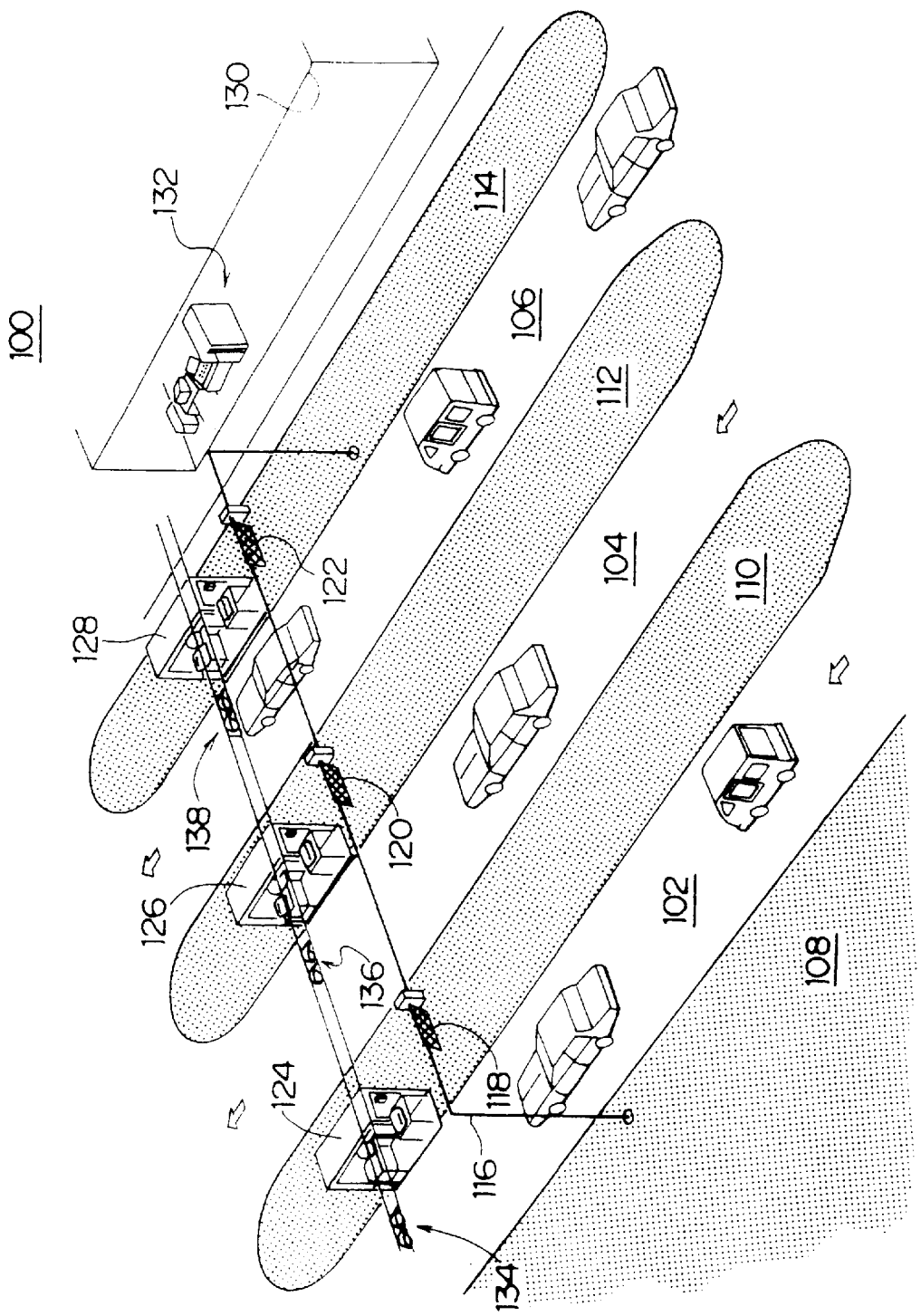
FIG. 3 is a schematic perspective view illustrating an entrance gate of the automatic toll receiving system shown in FIG. 2.

As shown in FIG. 3, the entrance gate 100 of the toll road has three lanes 102, 104 and 106. The lane 102 is formed between a site 108 and a separation zone 110, the lane 104 is formed between the separation zone 110 and a separation zone 112, and the lane 106 is formed between the separation zone 112 and a site 114. An arch 116 extends from the site 108 to the site 114 across these plural lanes. Entrance antennas 118, 120 and 122 (each corresponding to the entrance antenna 117 shown in FIG. 2) are disposed on the arch 116. The entrance antenna 118 transmits radio waves to a vehicle running along the lane 102 and receives the same therefrom and is located above the lane 102. Similarly, the entrance antenna 120 transmits radio waves to a vehicle running along the lane 104 and receives the same therefrom and is located above the lane 104. Further, the entrance antenna 122 transmits radio waves to a vehicle being driven along the lane 106 and receives the same therefrom and is disposed above the lane 106.

An entrance gate control center 130 having In entrance antenna control device 132 is disposed in the site 114. The entrance antennas 118, 120 and 122 are electrically connected to the entrance antenna control device 132.

The three entrance antennas 118, 120 and 122 are used as the entrance antennas as shown in FIG. 3 However, one or two entrance antennas may be used for one or two lanes. Alternatively, a number of entrance antennas may further be used.

Traffic ticket issuing devices 124, 126 and 128 (each corresponding to the traffic ticket issuing device 123 shown in FIG. 2) for issuing traffic tickets used to manually pay tolls are provided at the entrance gate 100 to provide convenience for vehicles from which the tolls cannot be automatically received or collected. The traffic ticket issuing device 124 corresponds to the lane 102 and is disposed on the downstream side of the separation zone 110 as seen in the direction in which the vehicle runs and on the lane 102 side of the separation zone 110. The traffic ticket issuing device 126 corresponds to the lane 104 and is disposed on the downstream side of the separation zone 112 as seen in the vehicle running direction and on the lane 104 side of the separation zone 112. Further, the traffic ticket issuing device 128 corresponds to the lane 106 and is disposed on the downstream side of the site 114 as seen in the vehicle running direction and on the lane 106 side of the site 114. These traffic ticket issuing devices 124, 126 and 128 are connected to the entrance gate control center 130.

Traffic signals 134, 136 and 138 for respectively providing instructions as to whether the vehicles may enter the lanes, are disposed on the downstream side of the arch 116 as seen in the vehicle traveling direction so as to correspond to the respective lanes. These traffic signals 134, 136 and 138 are connected to the entrance gate control center 130. Each of the traffic signals 134, 136 and 138 provides an indication (e.g., blue signal) for allowing the vehicle to enter into each lane or an indication (e.g., red signal) for disallowing the vehicle to enter into each lane.

The entrance gate control center 130 is connected to the central computer 400 (refer to FIG. 2). Incidentally, the entrance gate control center 130 may be used as an independent control system using only the entrance gate without being connected to the central computer 400.

Figure 4:
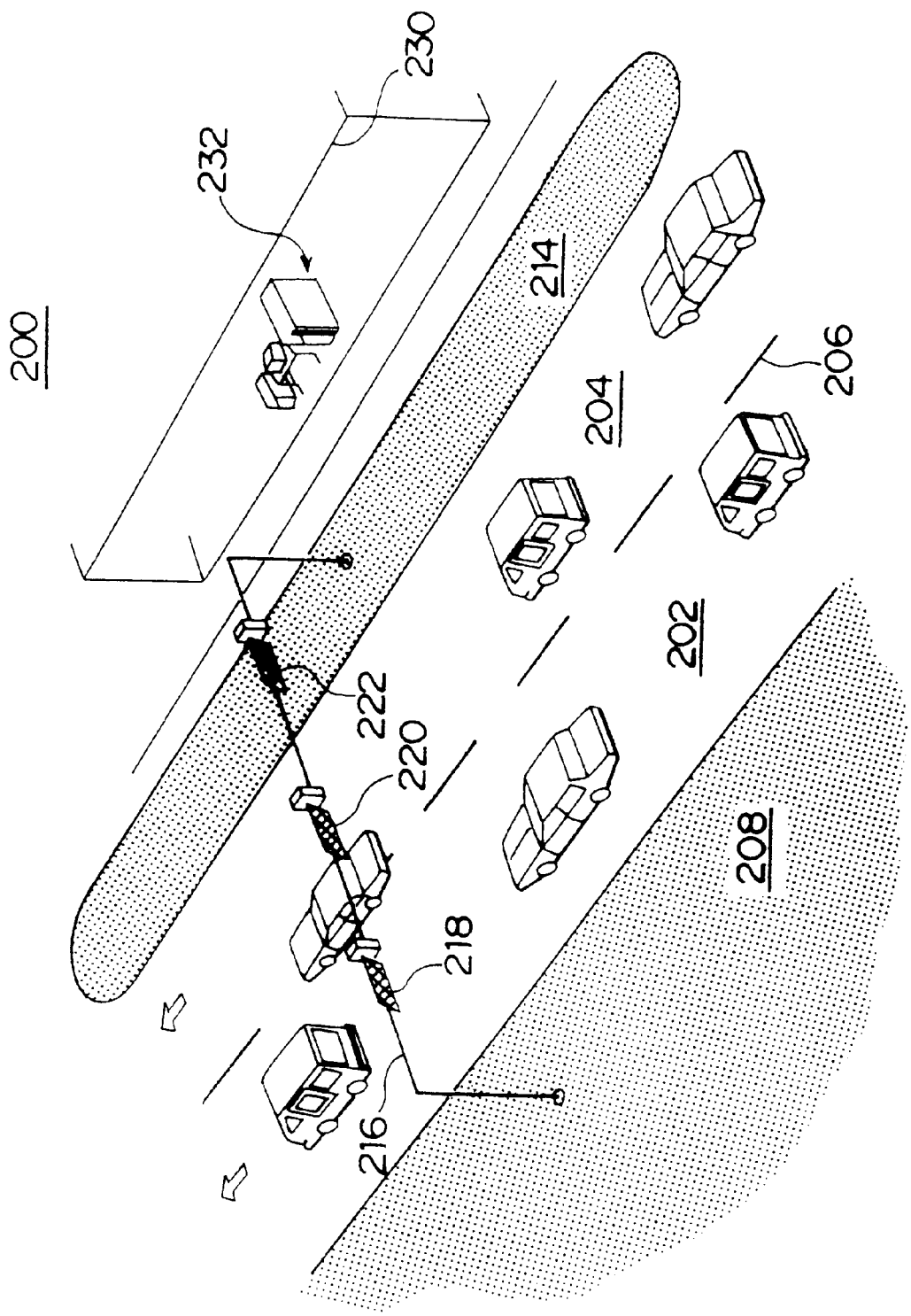
FIG. 4 is a schematic perspective view depicting a route provided in the course of the automatic toll receiving system shown in FIG. 2.

As shown in FIG. 4, two lanes 202 and 204 are provided adjacent to each other within a mid-route 200 provided immediately before or after a toll road. The adjacent lanes 202 and 204 are formed between a site 208 and a site 214. An arch 216 is provided so as to extend from the site 208 to the site 214 across the lanes 202 and 204. Route recognizing antennas 218, 220 and 222 (each corresponding to the route recognizing antenna 217 shown in FIG. 2) are disposed on the arch 216. The route recognizing antenna 218 transmits radio waves to a vehicle that travels on the lane 202 and receives the same therefrom, and is located above the lane 202. The route recognizing antenna 222 transmits radio waves to a vehicle that runs on the lane 204 and receives the same therefrom, and is located above the lane 204. The route recognizing antenna 220 for transmitting radio waves to a vehicle that travels across the lanes 202 and 204 is disposed in the vicinity of an intermediate portion between the route recognizing antennas 218 and 222 and above a center line 206 indicative of the boundary of the two lanes 202 and 204.

A route control center 230 having a route recognizing antenna control device 232 is provided at the site 214. The route recognizing antennas 218, 220 and 222 are connected to the route recognizing antenna control device 232.

Figure 5:
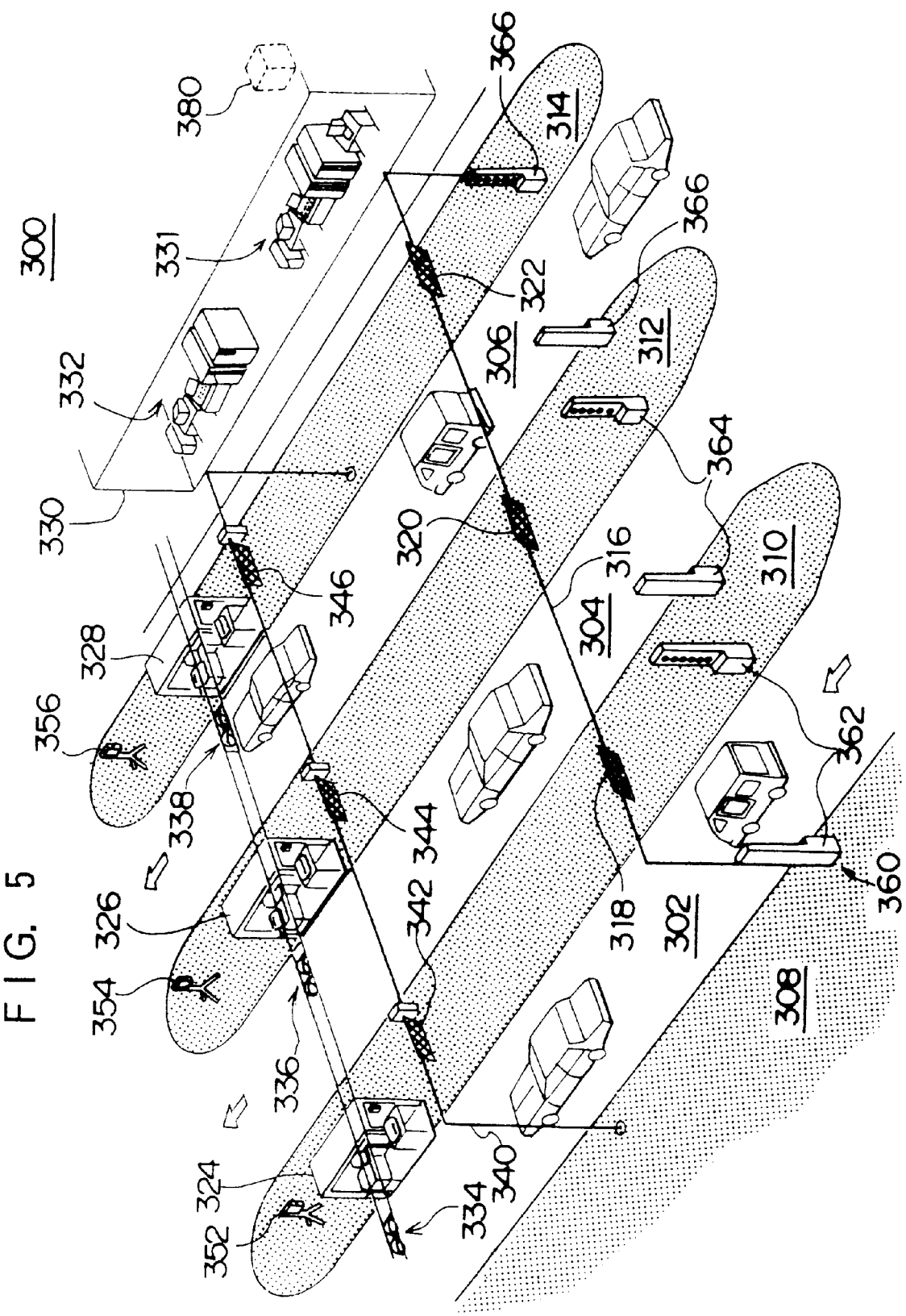
FIG. 5 is a schematic perspective view showing an exit gate of the automatic toll receiving system shown in FIG. 2.

As shown in FIG. 5, an exit gate 300 of a toll road has three lanes 302, 304 and 306. The lane 302 is formed between a site 308 and a separation zone 310, the lane 304 is formed between the separation zone 310 and a separation zone 312, and the lane 306 is formed between the separation zone 312 and a site 314.

An arch 316 is provided so as to extend from the site 308 to the site 314 across these lanes. Pre-notifying antennas 318, 320 and 322 (each corresponding to the pre-notifying antenna 317 shown in FIG. 2) are disposed on the arch 316. The pre-notifying antenna 318 transmits radio waves to a vehicle that runs on the lane 302 and receives the same therefrom, and is disposed above the lane 302. The pre-notifying antenna 320 transmits radio waves to a vehicle that travels on the lane 304 and receives the same therefrom, and is disposed above the lane 304. Similarly, the pre-notifying antenna 322 transmits radio waves to a vehicle which travels on the lane 306 and receives the same therefrom, and is disposed above the lane 306.

An exit gate control center 330 is disposed at the site 314. A pre-notifying antenna control device 331 and a toll gate antenna control device 322 to be described later are disposed within the exit gate control center 330. The pre-notifying antennas 318, 320 and 322 are electrically connected to the pre-notifying antenna control device 331.

Respective pairs of vehicle type detecting devices 362, 364 and 366 (each corresponding to the vehicle type detecting system 360 shown in FIG. 2) each composed of a CCD line scanner are provided in the vicinity of the arch 316. The vehicle type detecting devices 362 are used to identify the type of vehicle which runs on the lane 302 and are respectively disposed within the site 308 and the separation zone 310 associated with the lane 302. Similarly, the vehicle type detecting devices 364 arc used to identify the type of vehicle which runs on the lane 304 and are respectively disposed within the separation zone 310 and the separation zone 312 associated with the lane 304 near the arch 316. The vehicle type detecting devices 366 are used to identify the type of vehicle which runs on the lane 306 and are respectively disposed within the separation zone 312 and the site 314 associated with the lane 306. A vehicle type detecting system 360 composed of these vehicle type detecting devices is electrically connected to a local controller 380 to determine a silhouette of a passing vehicle by image processing based on an image obtained by the CCD line scanner, thereby making a decision about the type of vehicle. Thereafter, the vehicle type detecting system 360 transmits information about the type of vehicle to the local controller 380.

An arch 340 is disposed on the downstream side of the disposed position of the arch 316 as seen in the vehicle running direction so as to extend from the site 308 to the site 314 across the lanes. Toll gate antennas 342, 344 and 346 (each corresponding to the toll gate antenna 341 shown in FIG. 2) are provided on the arch 340. The toll gate antenna 342 serves so as to transfer radio waves indicative of information about a toll charged on a vehicle which runs on the lane 302, to the vehicle and receives the same therefrom, and is disposed above the lane 302. The toll gate antenna 344 transmits radio waves to a vehicle which runs on the lane 304 and receives the same therefrom, and is disposed above the lane 304. Similarly, the toll gate antenna 346 transmits radio waves to a vehicle which runs on the lane 306 and receives the same therefrom, and is disposed above the lane 306. These toll gate antennas 342, 344 and 346 are electrically connected to the toll gate antenna control device 332.

Toll paying boxes 324, 326 and 328 (each corresponding to the toll paying system 323 shown in FIG. 2) are provided at the exit gate 300 to cope with manually-paying vehicles from which tolls cannot be automatically received. The toll paying box 324 corresponds to the lane 302 and is disposed on the downstream side of the separation zone 310 as seen in the vehicle running direction and on the lane 302 side of the separation zone 310. Further, the toll paying box 326 corresponds to the lane 304 and is disposed on the downstream side of the separation zone 312 as seen in the vehicle running direction and on the lane 304 side of the separation zone 312. The toll paying box 328 corresponds to the lane 306 and is disposed on the downstream side of the site 314 as seen in the vehicle running direction and on the lane 306 side of the site 314. The toll paying boxes 324, 326 and 328 are respectively provided with unillustrated microcomputers and constitute the toll manually-paying system 323 for generally controlling the respective microcomputers to thereby manage information about tolls received on a manual payment. The toll manually-paying system 323 is connected to the local controller 380 (see FIG. 2).

Although the toll paying system 323 will be described in detail later, the toll paying system 323 also serves as a recovery gate for receiving tolls after completion of reception of data by using the IC card 62 when a communication error arises. Each of the toll paying boxes 324, 326 and 328 of the toll paying system 323 is provided with an IC card read/write device 61C (see FIG. 2) which is used as a reading means from which the IC card 62 is detachable. The IC card read/write device 61C is electrically connected to the central computer 400.

Incidentally, an insertion detecting device composed of a limit switch or a photointerrupter or the like for detecting the insertion of an IC card is attached to each of the IC card read/write devices 61A, 61B and 61C.

Further, cameras 352, 354 and 356 corresponding to imaging devices of an illegal traffic vehicle shooting system 350 (see FIG. 2) for photographing or shooting an illegal traffic vehicle are respectively disposed on the downstream sides of the toll paying boxes in the vehicle running direction so as to correspond to the lanes 302, 304 and 306. The illegal traffic vehicle shooting system 350 is electrically connected to the local controller 380.

Traffic signals 334, 336 and 338 for respectively providing instructions as to whether the vehicles may enter into the lanes, are disposed on the downstream side of the arch 340 as seen in the vehicle traveling direction so as to correspond to the lanes. These traffic signals 334, 336 and 338 are connected to the exit gate control center 330. Each of the traffic signals 334, 336 and 338 provides an indication (e.g., blue signal) for allowing the vehicle to enter into each lane or an indication (e.g., red signal) for disallowing the vehicle to enter into each lane.

The exit gate control center 330 is connected to the central computer 400 (refer to FIG. 2). Incidentally, the exit gate control center 330 may be configured as an independent control system using only the exit gate without being connected to the central computer 400.

The vehicle-mounted apparatus 30 and the on-road apparatus which communicates with the vehicle-mounted apparatus 30, will next be described. Incidentally, the on-road apparatus provided at the entrance gate 100 will be described as an illustrative example. For simplicity of illustration, the on-road apparatus will be explained using both the entrance antenna 118 for transmitting the radio waves to the vehicle driven along the lane 102 and receiving the same therefrom and the entrance antenna control device 132.

As shown in FIG. 1, the vehicle-mounted apparatus 30 has a receiving antenna 32 for receiving therein a data signal transmitted from the on-road apparatus. The receiving antenna 32 is electrically connected to a detector circuit 34 for detecting a modulated wave received by the receiving antenna 32 to thereby obtain a data signal. The detector circuit 34 is also electrically connected to a transmit circuit 50 to obtain a carrier of the radio wave sent from the on-road apparatus. The detector circuit 34 is electrically connected to a signal processing circuit 46 configured inclusive of a microcomputer through a data signal receive circuit 44. Processing programs and write conditions or the like are stored in the microcomputer of the signal processing circuit 46.

A memory circuit 48 used as a memory means is electrically connected to the signal processing circuit 46. The memory circuit 48 stores therein a vehicle number (identical to a number recorded on a number plate) as an ID code when the vehicle-mounted apparatus is installed on the vehicle, and also stores therein information about the type of vehicle with the apparatus mounted thereon. When the IC card 62 is inserted into the vehicle-mounted apparatus 30, information (such as information about the money left and the result of updating of the balance at the time that the IC card 62 is used within a service area at which the vehicle stops in the course of running of the vehicle) about the balance of the IC card 62 is stored in the memory circuit 48. Further, when the vehicle has passed through an entrance gate, a vehicle-type code detected at the entrance gate and entrance information (entrance number, date of passage of vehicle, etc.) are stored in the memory circuit 48. When the vehicle has passed through a mid-route (check barrier), check barrier information (check barrier number and date of vehicle passage) corresponding to the passed check barrier is stored in the memory circuit 48. When a communication error arises, communication error information (type of error, error-produced positions (type of gate, gate number, antenna number, etc.), date of occurrence of error, the number of times that an error occurs, etc.) or the like is stored in the memory circuit 48.

The transmit circuit 50 for transmitting a data signal or the like including an ID code as a response signal is electrically connected to the signal processing circuit 46. The transmit circuit 50 is also electrically connected to a transmitting antenna 52. The vehicle-mounted apparatus 30 modulates the carrier obtained by detecting the modulated wave received at the receiving antenna 32, based on a data signal sent from the signal processing circuit 46 and sends back the modulated carrier through the transmitting antenna 52. Incidentally, the transmitting antenna 52 serves as a transmitting/receiving antenna. Further, an unmodulated carrier sent from the on-road apparatus is received by the transmitting antenna 52. Thereafter, the unmodulated carrier may be modulated by the transmit circuit 50 based on the data signal produced from the signal processing circuit 46, so as to he sent back via the transmitting antenna 52.

An IC card read/write device 60 for reading data from the IC card 62 inserted therein and writing data into the IC card 62 is electrically connected to the vehicle-mounted apparatus 30. A limit switch 58 for mechanically detecting the insertion of the IC card 62 is provided within the IC card read/write device 60. Whether or not the IC card 62 has been inserted into the IC card read/write device 60, may be optically detected by determining, using a photointerrupter composed of a light-emitting element and a light-receiving element both disposed in opposing relationship, whether light is cut off by the inserted IC card.

A ten key 56 for inputting signals to a display 54 composed of an LCD or CRT for displaying the insertion and non-insertion of the IC card, the balance, etc. thereon, and the signal processing circuit 46 is electrically connected to the signal processing circuit 46.

A timer 45 for measuring a time interval and a built-in clock 47 used as a clock means for notifying the present time are connected to the signal processing circuit 46. Incidentally, the timer 45 may use a value obtained by counting the built-in clock.

An unillustrated power compensating circuit is electrically connected to the signal processing circuit 46 and the built-in clock 47 of the vehicle-mounted apparatus 30 and an unillustrated vehicle-mounted battery is connected thereto through an ignition switch. When power supplied from the battery is less than a predetermined value and it is expected that it is difficult for the vehicle-mounted apparatus 30 to normally communicate by radio waves, the power compensating circuit outputs a signal to the signal processing circuit 46.

Figure 6:
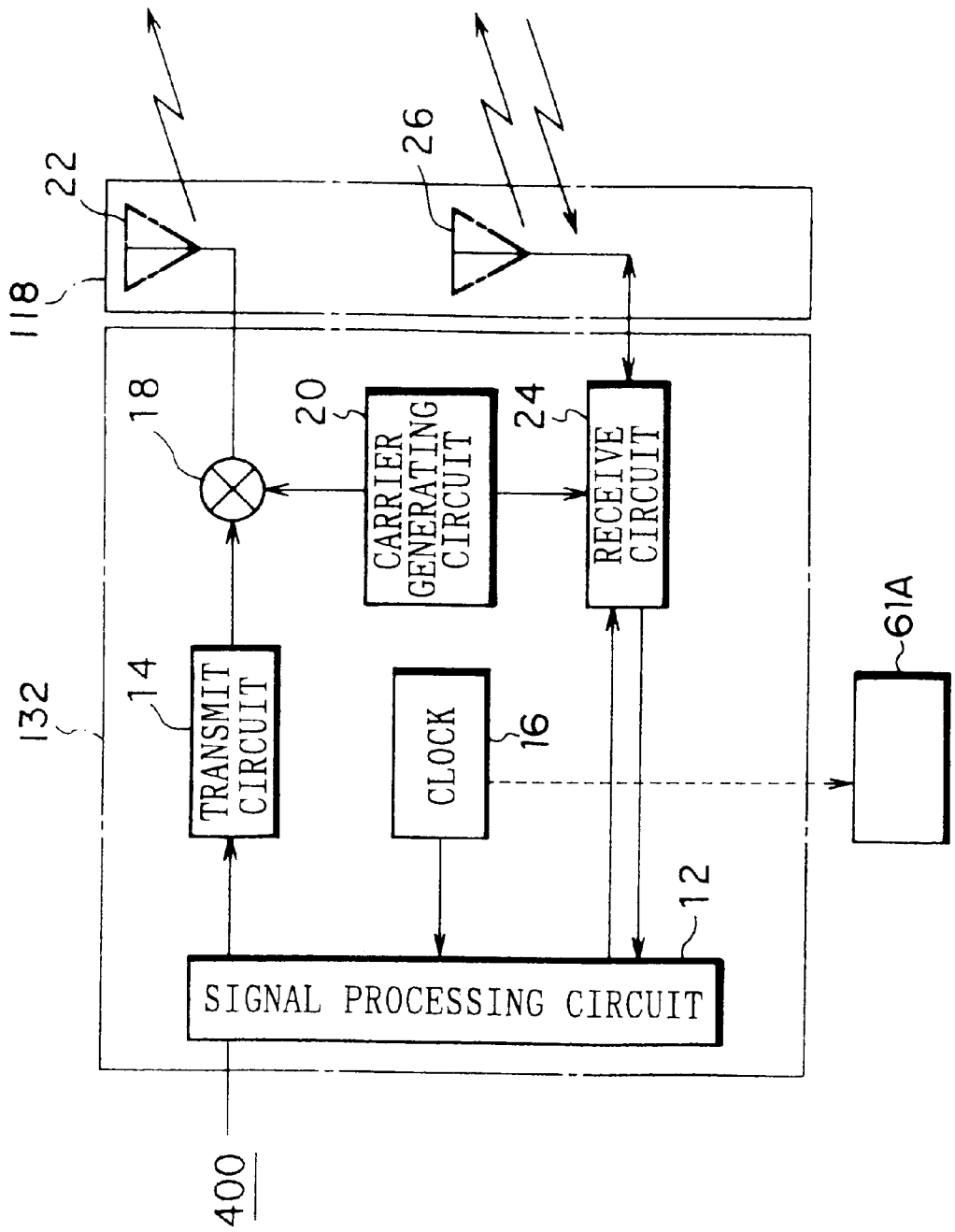
FIG. 6 is a block diagram illustrating one example of an on-road apparatus.

As shown in FIG. 6, an on-load apparatus for a vehicle which runs on the lane 102, is composed of an entrance antenna 118 and an entrance antenna control device 132. The entrance antenna 118 comprises a transmitting antenna 22 and a receiving antenna 26. The entrance antenna control device 132 has a signal processing circuit 12 configured inclusive of a microcomputer. Processing programs to be described later have been stored in the microcomputer. The signal processing circuit 12 is electrically connectable to the central computer 400. The signal processing circuit 12 is electrically connected to a transmit circuit 14 for generating a data signal (communication request signal) including a command. The transmit circuit 14 is electrically connected to the transmitting antenna 22 through a mixer 18. A circuit 20 for generating a carrier of a predetermined frequency is electrically connected to the mixer 18, which mixes the signal input thereto from the transmit circuit 14 with the carrier input thereto from the carrier generating circuit 20 to modulate the carrier input from the carrier generating circuit 20 based on the signal input from the transmit circuit 14. Further, the modulated wave is transmitted through the transmitting antenna 22 as a radio wave.

A receive circuit 24 for extracting a data signal from the modulated wave received by the receiving antenna 26 after having been modulated by the vehicle-mounted apparatus 30 shown in FIG. 1 and sent back therefrom, is electrically connected to the carrier generating circuit 20. The receive circuit 24 is electrically connected to the signal processing circuit 12. Further, the receive circuit 24 is also electrically connected to the carrier generating circuit 20 and is supplied with a carrier transmitted for comparison with a carrier included in the signal sent back from the vehicle-mounted apparatus 30.

A reference clock 16 used as a time means for notifying the present time on the on-road apparatus side is electrically connected to the signal processing circuit 12. A time counted by the central computer 400 may be input as the present time on the on-road apparatus side.

Since other entrance antennas at the entrance gate 100 are identical in configuration to those referred to above, their description will be omitted. Further, since respective antennas and antenna control devices at a mid-route 200 and an exit gate 300 are substantially identical in configuration to those referred to above, their description will be omitted.

In the vehicle-mounted apparatus and on-road apparatus, the antenna comprised of the two transmitting and receiving antennas separated from each other is used. However, a transmission/reception integral-type antenna may be used as a flat antenna.

Figure 7:
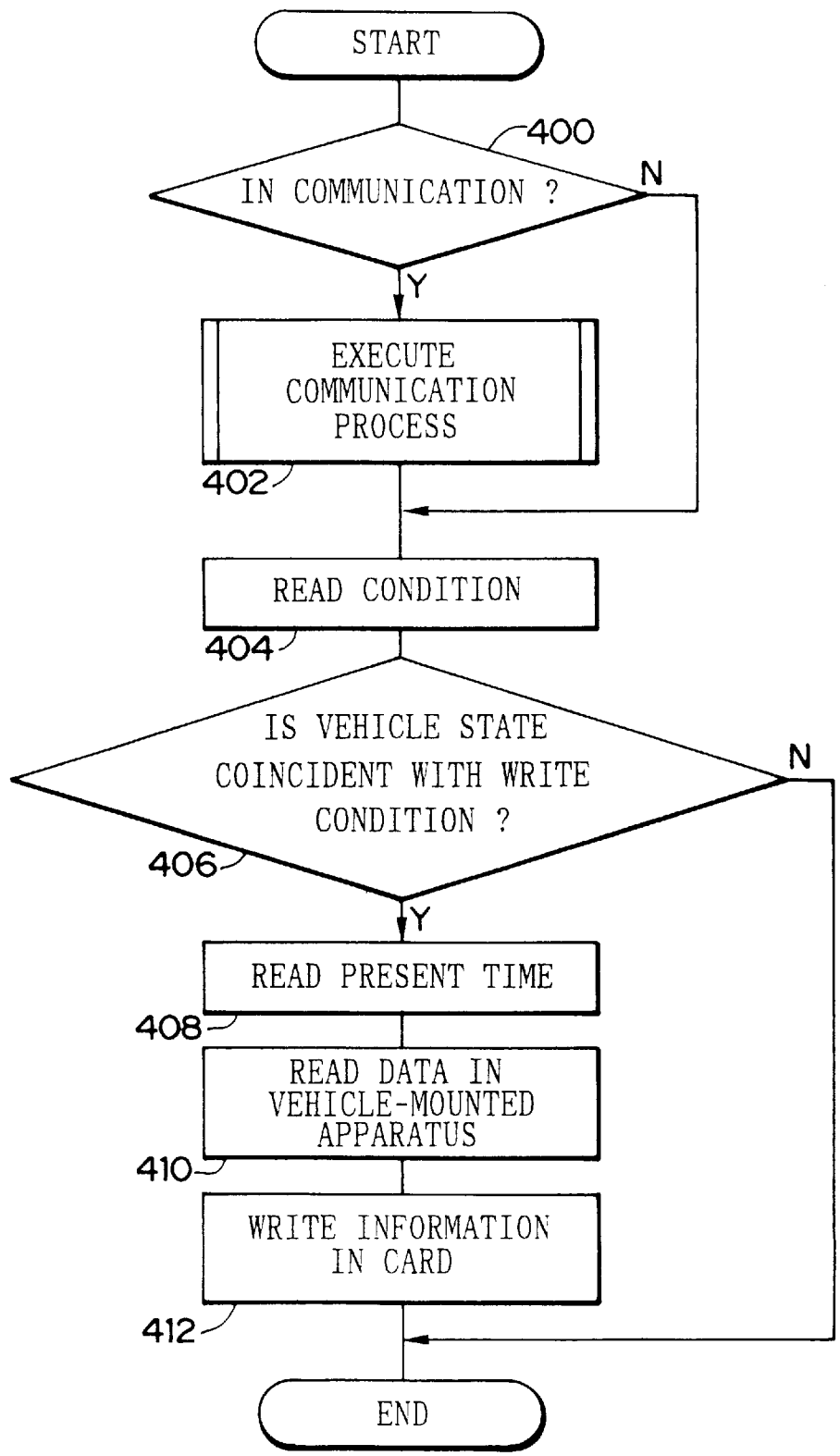
FIG. 7 is a flowchart for describing a process routine of a vehicle-mounted apparatus.

Processing routines of the vehicle-mounted apparatus and the on-road apparatus according to the present embodiment will next be described. FIG. 7 shows a service or processing routine of a vehicle-mounted apparatus. It is judged in Step 400 whether the vehicle-mounted apparatus is in communication with the on-road appratus. If the answer is found to be Yes in Step 400, then the routine procedure proceeds to Step 402 where a communication process (to be described in detail later) such as transmission and reception of entrance information, a toll receipt process or the like is executed In Step 404, write conditions are read. The write conditions are used to judge whether information should be written into the IC card 62. The following write conditions are mentioned.

[Write Conditions]

(1) when a write request switch is pressed under a keyboard operation of an occupant:

(2) when a vehicle stops:

(3) when the speed of the vehicle reaches a low speed (predetermined vehicle speed or less):

(4) when the IC card 62 is inserted:

(5) when a trigger signal generated when a vehicle having a navigation system reaches the neighborhood of an exit gate, is input:

(6) when an information write request signal sent from the on-road apparatus is received:

(7) when an information write notifying means (such as magnetic information or bar-code information) for indicating an exit gate is provided on the road side and immediately before the exit gate, a reader for reading the information write notifying means is attached to the vehicle-mounted apparatus and the vehicle-mounted apparatus reads the magnetic information or the bar-code information:

(8) whether an automatic insertion/extraction device (loader) capable of automatically inserting the IC card into and extracting it from the vehicle-mounted apparatus is installed. Write conditions differ according to the presence or absence of the loader. Namely, when the loader exists, the IC card is in a state immediately after having been inserted into the vehicle-mounted apparatus or in a state immediately before the IC card is brought into a state of being able to be extract from the vehicle-mounted apparatus. When the insertion of the IC card is detected since the IC card is always in a state extractable by the occupant when the loader does not exist:

(9) when a predetermined time has elapsed:

Any one of the write conditions referred to above may be used. Alternatively, a plurality of write conditions are read and may be successively used for decision.

Since the communication process between the on-road apparatus and the vehicle-mounted apparatus is occasionally executed while the vehicle is running, the time required to communicate between the two often becomes short. Thus, when the communication process coincides in time with a process for writing information into the IC card 62, a communication error occurs. When a write process is adopted for each predetermined time interval according to the write condition (9), for example, the process might be occasionally executed during the communication with the on-road apparatus while the vehicle-mounted apparatus is moving. Therefore, a process to be executed after completion of communications, for example, may preferably be added to the write condition without the communication process being executed between the on-road apparatus and the vehicle-mounted apparatus.

It is judged in the next Step 406 whether the present state (including the state of the vehicle-mounted apparatus) of the vehicle is included within the read write condition. According to the examples of the above-described write conditions, for example, whether or not a write request has been made, is determined by judging whether the write request switch has been pressed by the keyboard operation (manual operation) of the occupant such as the driver or the like. It is thus possible to judge whether the vehicle state coincides with the write condition (1). Since it is considered that the vehicle approaches the gate or is running along the gate when the vehicle stops or runs at low speed, whether the vehicle stops or is at low speed, is judged by detecting the speed of the vehicle. It is thus possible to judge whether the vehicle state coincides with the write condition (2) or (3). It is judged, based on a decision made as to whether the limit switch 58 has been changed from off to on, whether the IC card has been changed from an absent state to a present state, i.e., the IC card has been inserted. It is thus possible to judge whether the vehicle state coincides with the write condition (4).

Since the vehicle with the navigation system mounted thereon can recognize that it has reached the neighborhood of the exit gate, it is possible to judge, based on a decision made as to whether a trigger signal indicative of the neighborhood of the exit gate has been input from the navigation system, whether the vehicle state coincides with the write condition (5).

If a signal indicative of a request for writing information into the IC card is transmitted from the on-road apparatus to the vehicle-mounted apparatus, it is then possible to judge, based on a decision made as to whether the information write request signal transmitted from the on-road apparatus has been received, whether the vehicle state coincides with the write condition (6). If the magnetic information indicative of the exit gate or the bar-code information or the like is provided immediately before the exit gate and on the road side, it is then possible to judge, based on a decision made as to whether the magnetic information or the bar-code information has been read, whether the vehicle state coincides with the write condition (7).

According to the type of vehicle-mounted apparatus, the loader in which the IC card has been installed is known. Thus, when the loader exists, a state immediately after the insertion of the IC card or a state immediately before the IC card is brought into an extractable state, is input as a trigger signal from the loader. It is thus judged whether the trigger signal has been input from the loader. When the loader is not provided, whether or not the vehicle state coincides with the write condition (8), can be determined by judging whether the IC card has been inserted as described in the write condition (4).

Whether or not a predetermined time has elapsed, is judged by measuring the predetermined time by the timer and monitoring the timer. It is thus possible to judge, based on the result of judgment, whether the vehicle state coincides with the write condition (9).

Steps 404 and 406 referred to above correspond to determination made by a determining means of the present invention.

If it is judged in Step 406 that the present state of vehicle has coincided with the write condition, then the routine procedure proceeds to Step 408 where the present time is read from the built-in clock 47. In the next Step 410, the information, which has been stored in the memory circuit 48, is read out. Further, in the next Step 412, the present time is written into the IC card as time information and the thus-read information is written therein. Steps 408 through 412 referred to above correspond to a process executed by a processing means of the present invention.

Thus, since the present time at the time of the writing is written into the IC card as the time information together with the data stored in the vehicle-mounted apparatus side, which communicated with the on-road apparatus, the data in the vehicle-mounted apparatus can be confirmed on the on-road apparatus by reading the time information and the data written into the IC card on the on-road apparatus side. It is also possible to confirm the timing provided to write the data read from the IC card and related to the communications of the vehicle-mounted apparatus. Further, since the timing provided to write the data on the vehicle-mounted apparatus side can be confirmed on the on-road apparatus side, the toll can be prevented from being misreceived from the IC card delivered by hand to an operator or the like at a manned gate without the data being written into the IC card by the occupant, whereby a reliable process can be executed. Since the timing provided to write the data on the vehicle-mounted apparatus side can be confirmed on the on-road apparatus side, the on-road apparatus can easily find illegal contents on the side of a user who used the old or past data in terms of the time. Since the operator is placed in the manned gate or a control office, preventing irregularities from occurring is also obtained.

In addition to the use of the IC card at the exit gate, the IC card can be inserted into the IC card read/write device at the recovery gate of the on-road apparatus installed in the entrance gate 100 or the mid-route 200 to write the originally required data therein.

Figure 8:
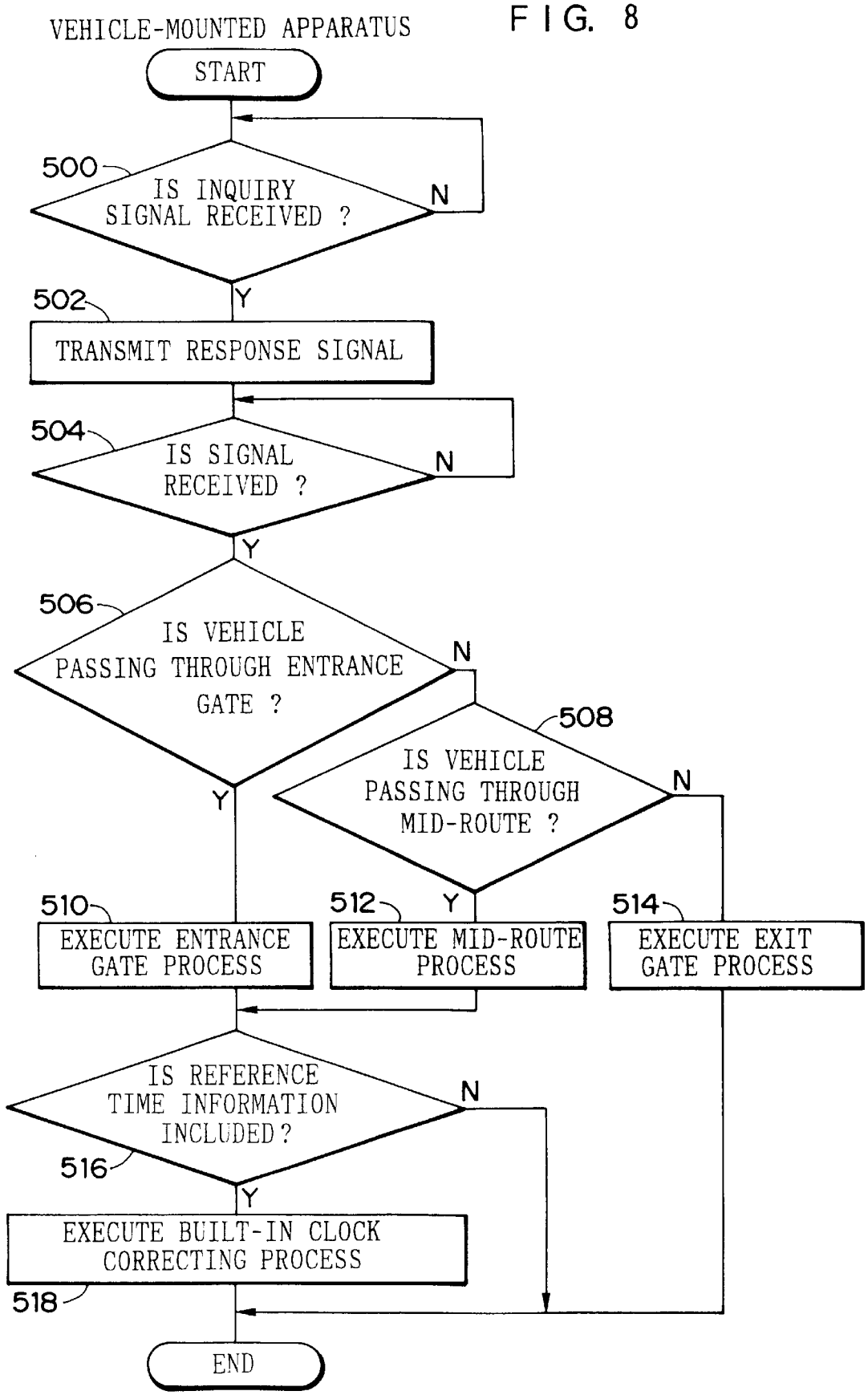
FIG. 8 is a flowchart for explaining details of Step 402 shown in FIG. 7.

FIG. 8 shows in detail the communication process in Step 402 of the processing routine of the vehicle-mounted apparatus, which is shown in FIG. 7. If it is judged in Step 500 that an inquiry signal has been received from the on-road apparatus, then the routine procedure proceeds to Step 502 where the received inquiry signal is regarded as a carrier and a wave produced by modulating the carrier with an ID code corresponding to an identification code for specifying his/her own vehicle is transmitted as a response signal.

If it is judged in Step 504 that a signal sent from the on-road apparatus has been received, it is then determined whether an entrance gate number is included in the signal received in Step 506. It is thus possible to judge whether the vehicle is now passing through the entrance gate. If the answer is found to be No in Step 506, then the routine procedure proceeds to Step 508. If the answer is found to be Yes in Step 506, then the routine procedure proceeds to Step 510 where an entrance gate process is executed. In the entrance gate process executed in Step 510, entrance information about the entrance gate number included in the signal received in Step 504 is stored in the memory circuit 48 of the vehicle-mounted apparatus 30.

When the entrance gate process is completed, it is judged in Step 516 whether reference time information is included in the received signal. The reference time information indicates the time used as a standard time on the on-road apparatus side. If the answer is found to be No in Step 516, then the routine procedure is terminated as it is. On the other hand, when the answer is found to be Yes in Step 516, the routine procedure proceeds to Step 518 where a built-in clock correcting process is executed. This built-in clock correcting process corresponds to a process for causing the present time of the built-in clock 47 in the vehicle-mounted apparatus to coincide with the reference time of the on-road apparatus, which is included in the received signal.

Thus, the time of the built-in clock in the vehicle-mounted apparatus can be synchronized with the reference time sent from the on-road apparatus. Accordingly, a time lag of the built-in clock in the vehicle-mounted apparatus is resolved so that variations in the present times for every vehicle-mounted apparatuses can be avoided.

It is judged in Step 508, based on a decision made as to whether a mid-route code (check barrier information) is included in the signal received in Step 506, whether the vehicle has passed through the mid-route 200. If it is judged in Step 508 that the vehicle has passed through the mid-route 200, then the routine procedure proceeds to Step 512 where a mid-route process is executed. If it is judged in Step 508 that the vehicle does not pass through the mid-route 200, it is then determined that the vehicle is passing through the exit gate and an exit gate process is executed in Step 514. In the mid-route process executed in Step 512, mid-route information based on the mid-route code included in the signal received in Step 504 is stored in the memory circuit 48 of the vehicle-mounted apparatus 30.

After completion of the mid-route process, the routine procedure proceeds to Steps 516 and 518, where the present time of the built-in clock 47 in the vehicle-mounted apparatus is allowed to coincide with the reference time on the on-road apparatus side when the reference time information is included in the received signal as described above. Steps 516 and 518 referred to above correspond to a process of a time information correcting means employed in the third aspect of the present invention.

Thus, since the built-in clock can be corrected in the mid-route, it is possible to suppress or control an accumulation of time errors which occur in the built-in clock due to the travel distance (running time) of the vehicle and avoid variations in time, which are produced at every vehicle-mounted apparatuses.

In the exit gate process executed in Step 514, a process for calculating tolls charged on a route extending from the entrance gate to the exit gate with the mid-route interposed therebetween from the present balance on the basis of vehicle-type information stored in the vehicle-mounted apparatus, balance information stored in a general card mounted in the vehicle-mounted apparatus and a toll table recorded in the vehicle-mounted apparatus in advance, and automatically collecting or receiving the charged tolls is executed. After the tolls have been normally received, entrance information is cleared.

The embodiment illustrated above has described the case in which the time of the built-in clock in the vehicle-mounted apparatus is corrected to the reference time of the reference clock in the on-road apparatus at the entrance gate and in the mid-route. However, the gate and barrier for compensating for the built-in clock may be placed in any locations in the course of running of the vehicle.

Figure 10:
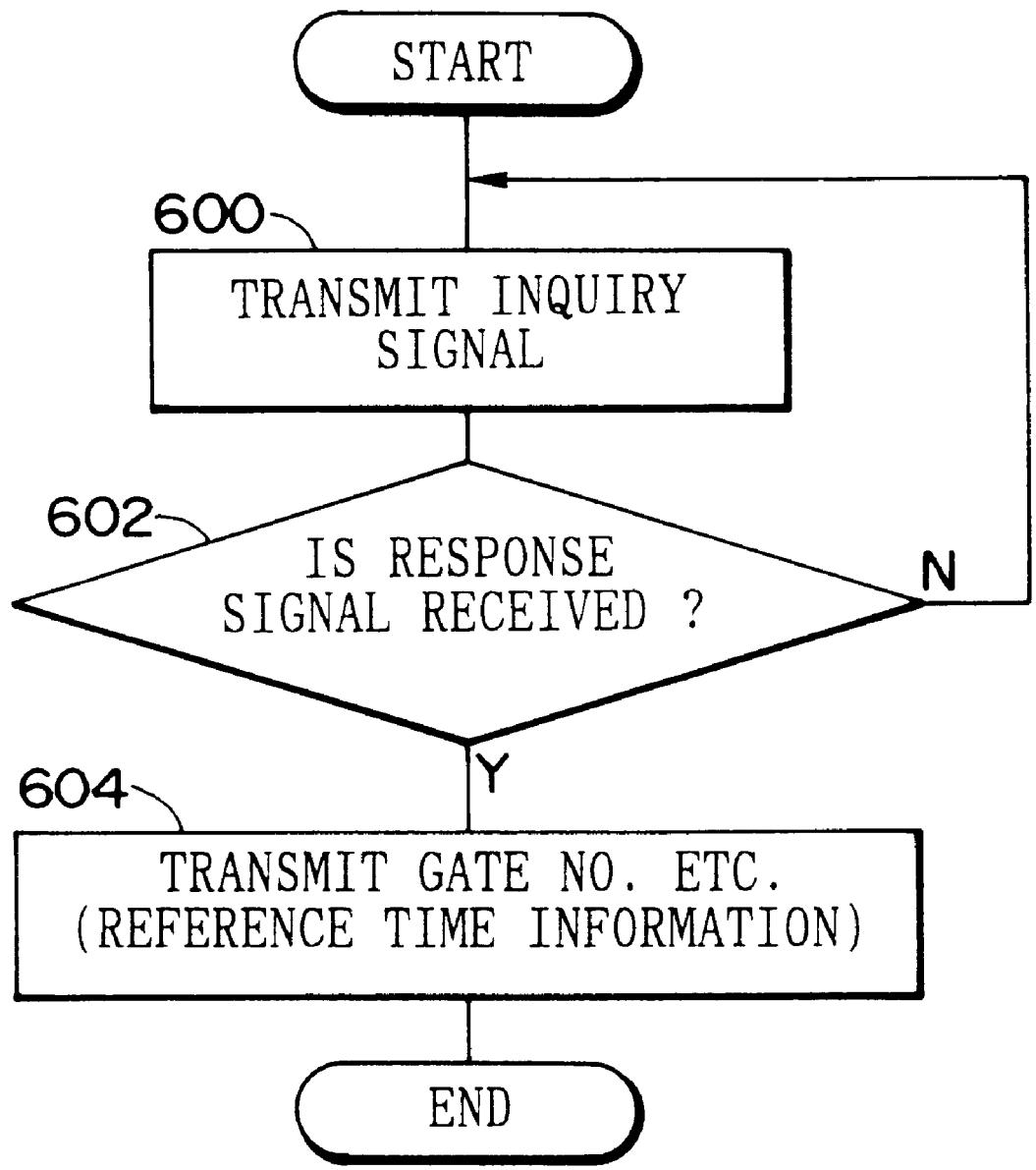
FIG. 10 is a flowchart for describing a process routine of an on-road apparatus.

In the on-road apparatus provided at the entrance gate, an inquiry signal composed of a continuous wave is transmitted in Step 600 until the on-road apparatus receives a response signal from the vehicle-mounted apparatus as shown in FIG. 10. If it is judged in Step 602 that the on-road apparatus has received the response signal from the vehicle-mounted apparatus, then the routine procedure proceeds to Step 604 where reference time information indicative of the present time read from the reference clock 16 and a signal including an entrance gate number, etc. are transmitted.

The on-road apparatus placed in the mid-route 200 performs a process substantially similar to that executed by the on-road apparatus provided at the entrance gate. However, a signal including a mid-route code indicative of the mid-route, etc. is transmitted in place of the signal including the entrance gate and the like in Step 604.

An on-road apparatus DA composed of the pre-notifying antenna 317 and the pre-notifying antenna control device 331 and an on-road apparatus DB (see FIG. 2) composed of the toll gate antenna 341 and the toll gate antenna control device 332 are provided at the exit gate 300. The on-road apparatus DA performs a process substantially similar to the above-described process and transmits a signal including an exit code indicative of the exit gate 300, etc. therefrom in Step 604. Further, the on-road apparatus DB transmits the signal including the exit code indicative of the exit gate 300, etc. and executes a toll receiving process by radio communications in Step 604.

When a communication error occurs in at least one of the vehicle-mounted apparatus and the on-road apparatus, there may be cases where information is not properly transferred between the vehicle-mounted apparatus and the on-road apparatus. Thus, when the communication error arises, the occupant goes to a manned gate such as a toll paying box or a recover gate with an IC card read/write device mounted therein, or a control office or the like. The manned exit gate or the control office at the exit gate orally inquires why the occupant came to the manned gate or the control office. When the occupant comes thereto carelessly, the manned gate or the control office informs the occupant of the proper passage. When the occupant comes thereto due to the occurrence of the communication error or the like, the manned gate or the control office visually judges whether the vehicle-mounted apparatus is being installed on the vehicle. If the vehicle-mounted apparatus is found not to be installed, then the occupant executes the normal manually-paying process through the toll paying box. On the other hand, when the apparatus is installed on the vehicle, the manned gate or the control office requires the occupant to present his/her IC card and executes a toll receiving process using the presented IC card.

Figure 9:
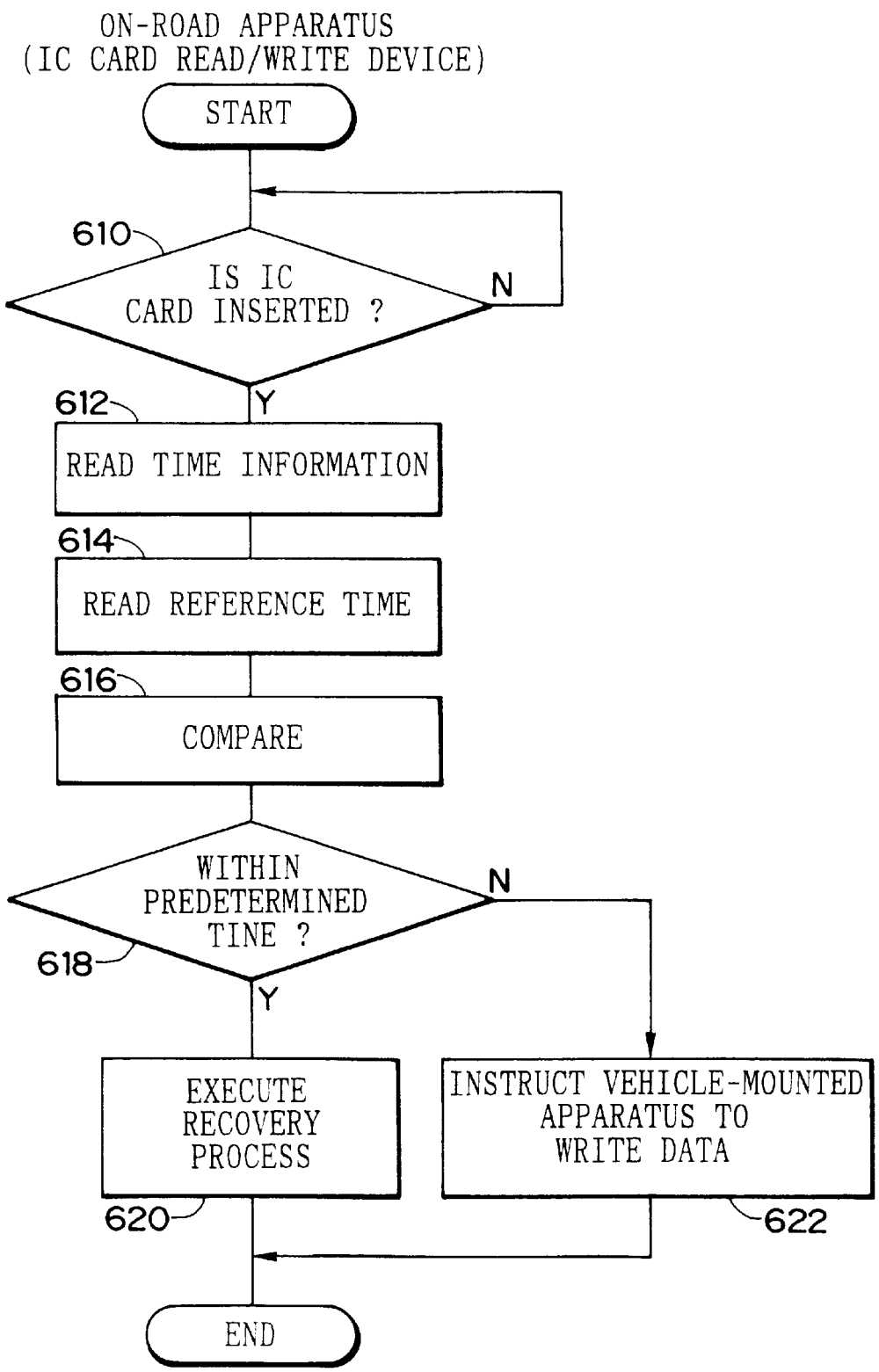

FIG. 9 shows the flow of a process with respect to the IC card read/write device such as the toll paying box or the recover gate or the like in which the IC card read/write device has been installed. If it is judged in Step 610 that the IC card has been inserted into the IC card read/write device, then the time information recorded in the IC card is read in the next Step 612. In the next Step 614, the present time (reference time) on the on-road apparatus side is read. Further, in the next Step 616, the read reference time is compared with the time when data has been written into the IC card in the vehicle-mounted apparatus, represented by the time information. It is judged in the next Step 618 whether the result of comparison, i.e., the difference between the reference time and the time on the vehicle-mounted apparatus side falls within a predetermined time (e.g., 15 minutes).

When the time difference falls within the predetermined time, the data recorded in the IC card is judged to be the latest and a recovery process is executed in Step 620. The recovery process is used to perform the toll receiving process at the exit gate. The toll receiving process is executed using the data recorded in the IC card.

Similarly to the result of processing by the communications, a process for writing the reference time information indicative of the present time read from the reference clock 16 and the information such as the entrance number or the like is executed at the entrance gate. Further, a process similar to the process at the entrance gate is executed in the midroute 200. In this case, however, a process for writing a mid-route code or the like indicative of the mid-route in place of the signal including the entrance gate number or the like is executed. When various information is written into the IC card at the entrance gate or in the mid-route without depending on the communications, a process for inserting the IC card into the vehicle-mounted apparatus to load the memory circuit and correct the built-in clock based on the stored reference time information can be additionally provided.

On the other hand, when the time difference exceeds the predetermined time, it is judged that there is the possibility that the data recorded in the IC card will be previously-used one or will not be the latest. In Step 622, the occupant is required to write data into the IC card again and the IC card is extracted to return to the occupant. The occupant writes data and time information into the returned IC card and thereafter redelivers the IC card to the operator in the manned gate. Afterwards, the routine procedure is executed from Step 610 again.

Step 612 mentioned above corresponds to a process executed by a reading means employed in the second aspect of the present invention. Steps 614 and 616 correspond to a process executed by a compare means and Step 620 corresponds to a process executed by a control means.

Thus, when the predetermined difference exists between the present time read on the on-road apparatus side and the time when the data has been written into the IC card, the data can be judged to be old, i.e., ineffective or invalid data. It is thus possible to request the occupant to execute a rewriting process with a view to writing new data into the IC card.

Incidentially, the present system is applicable to a simple toll-receiving type road or a parking area with no entrance gate. Namely, since the simple toll-receiving type road or the like has no entrance, it is unnecessary to read information about the vehicle-mounted apparatus. Therefore, a process for receiving a toll through an occupant's IC card can be performed by simply delivering the occupant's IC card to the operator. Accordingly, the system according to the present embodiment can be easily applied to the road or parking area.

According to the present embodiment, as has been described above, the built-in clock of the vehicle-mounted apparatus indicates the time synchronized with that of the reference clock of the on-road apparatus. Therefore, time control on each vehicle lying within the toll road becomes unnecessary on the on-road apparatus side, so that a load imposed on the system is lessened.

Since the data and the time information are written into the IC card, the reliability of the data can be improved. Further, since the writing of the data therein is judged based on write conditions for a simple operation such as a switch operation by a keyboard and a simple process, misoperations or the like can be suppressed and an improvement in reliability can be accomplished. Since the simple operation or the simple process is defined as the object, the IC card read/write device on the on-road apparatus side can be simplified in structure and only a simple change in process such as an addition of a process procedure may be done on the vehicle-mounted apparatus side.

Further, since the transfer of information between the vehicle-mounted apparatus and the on-road apparatus can be made using the IC card alone, it is necessary to further prepare a management or control card for managing information and hence a decrease in complexity at the time that a plurality of cards are used, can be achieved. Moreover, a special process such as a check against illegal utilization of the management card and improper cards or the like also becomes unnecessary, so that a process load on the system side can be lessened.

In the above-described embodiment, when the difference between the reference time on the on-road apparatus side and the time information recorded in the IC card at the vehicle-mounted apparatus exceeds the predetermined time (e.g., 15 minutes), the data recorded in the IC card is judged to be the invalid data. However, there may be cases in which an error occurs in the reference clock on the on-road apparatus side, e.g., a large time delay and the cessation of a clock, or the like occur and an error occurs in the built-in clock of the vehicle-mounted apparatus. In this case, the time information recorded in the IC card is judged to the invalid data, whereas data such as entrance information or the like is judged to be effective or valid data.

Thus, a process in which when the time information recorded in the IC card is judged as the invalid data, all the data assumed to be valid without the invalid data are used as, will next be described as another embodiment with reference to FIGS. 11 through 14. Since the present embodiment is identical in structure to the above-described embodiments, the same elements of structure as those shown in the embodiments are identified by the same reference numerals and their detailed description will be omitted. In the present embodiment, a failure flag indicative of failure of time information can be read from or written into the IC card.

Figure 11:
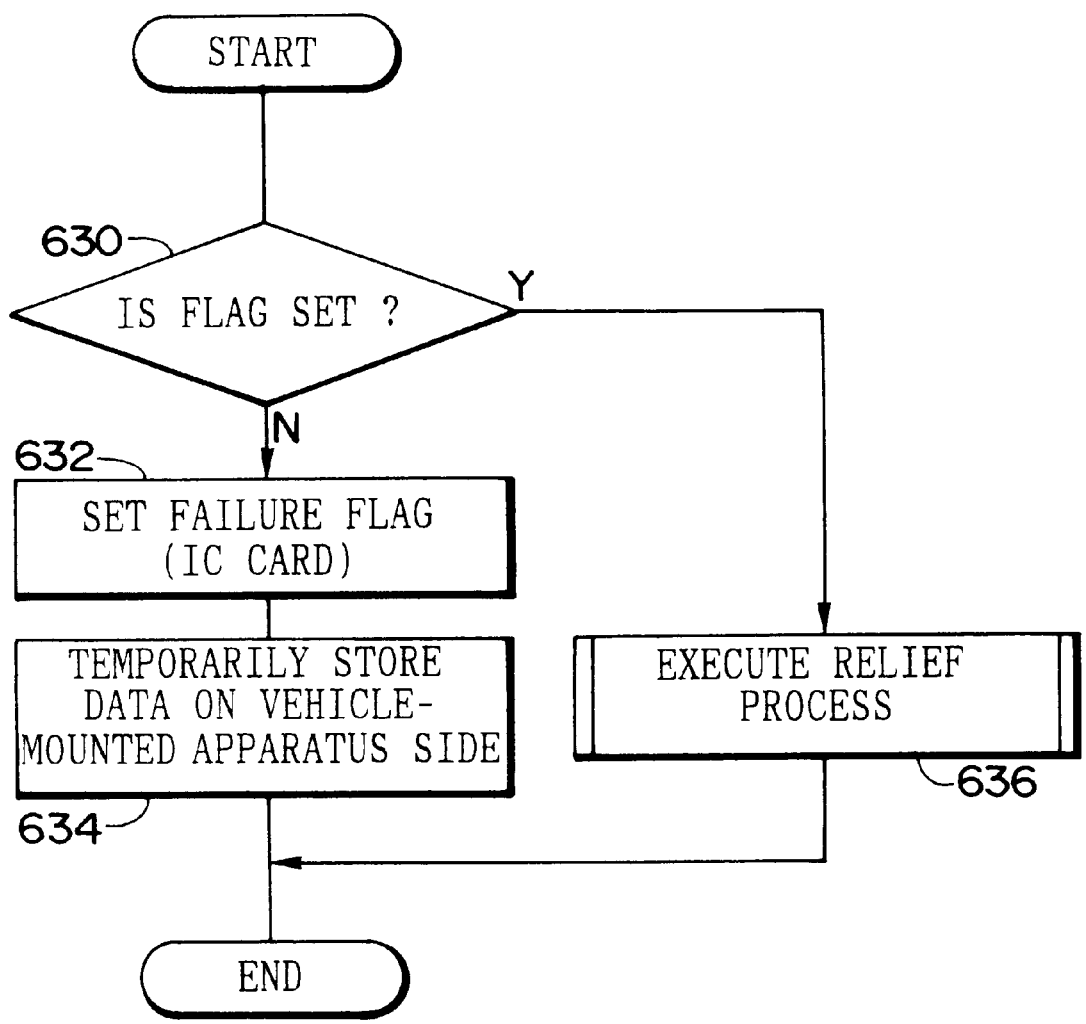
FIG. 11 is a flowchart for describing a part of a process routine related to an IC card read/write device of an on-road apparatus according to another embodiment.

In the present embodiment, a process routine shown in FIG. 11 is executed in place of Step 622 shown in FIG. 9. Namely, when it is judged that the difference between the reference time and the time on the vehicle-mounted apparatus side exceeds a predetermined time (e.g., 15 minutes) (see Step 618 in FIG. 9), it is judged in Step 630 shown in FIG. 11 whether the failing flag to be described later has been set to the IC card. It is further judged based on the result of judgment, whether a process after the IC card returned to an occupant has been presented again, should be done. When it is judged in Step 630 that the failure flag has not been set to the IC card, the initial process is done. Therefore, the failure flag is set to the IC card in the next Step 632. In the next Step 634, data of the vehicle-mounted apparatus, such as entrance information or the like recorded in the IC card is temporarily stored in a memory. In consideration of the case where the data already written into the IC card is not erased by the vehicle-mounted apparatus, it is preferable to erase the data written into the IC card after the data of the vehicle-mounted apparatus has been stored in the memory.

Incidentally, the vehicle-mounted apparatus can also recognize a failure in clock by referring to the failure flag set to the IC card.

When the failure flag is set in the above-described manner and the time difference exceeds the predetermined time, the routine procedure proceeds to Step 636 where a relief process (see FIG. 12) is executed. In Step 640 shown in FIG. 12, the data written into the IC card after the failure flag has been set thereto is read, and the data temporarily stored in the memory is read. It is judged in the next Step 642 whether these data coincide with each other. When they do not coincide with each other, it is estimated that the read data is low in reliability and the clock built into the vehicle-mounted apparatus malfunctions. Therefore, an NG process is executed in Step 654. The NG process, for example, notifies NG to an operator in a manned gate by a display or the like. Thus, the operator in the manned gate can urge a vehicle occupant to consider the need of repairs for the improper vehicle-mounted apparatus and is able to execute a manually-paying toll reception.

When they coincide with each other and the answer is found to be affirmative in Step 642, the routine procedure proceeds to Step 644 where it is judged whether a correction value has been set. When the reference clock in the gate is estimated to be delayed a predetermined time, the correction value is used to correct it (the correction value will be described in detail later). When the correction value is not set, a correction process is executed in Step 648. It is thereafter judged in Step 650 whether the correction can be done. If the answer is found to be Yes in Step 650, then the routine procedure proceeds to Step 652 where a toll receiving process is executed based on the corrected time. If the answer is found to be No in Step 650, then the routine procedure proceeds to Step 654.

When the correction value already exists, it is judged in Step 644 that the answer is affirmative. It is thereafter judged in Step 646 whether the time difference corrected based on the correction value falls within a predetermined time. If it is judged in Step 646 that the time difference falls within the predetermined time, then the time can be corrected. Namely, it is judged in Step 650 that the answer is affirmative, and thereafter the toll receiving process is executed in Step 652. On the other hand, when the corrected time difference exceeds the predetermined time, the routine proceeds to Step 648 again to obtain a new correction value.

Figure 12:
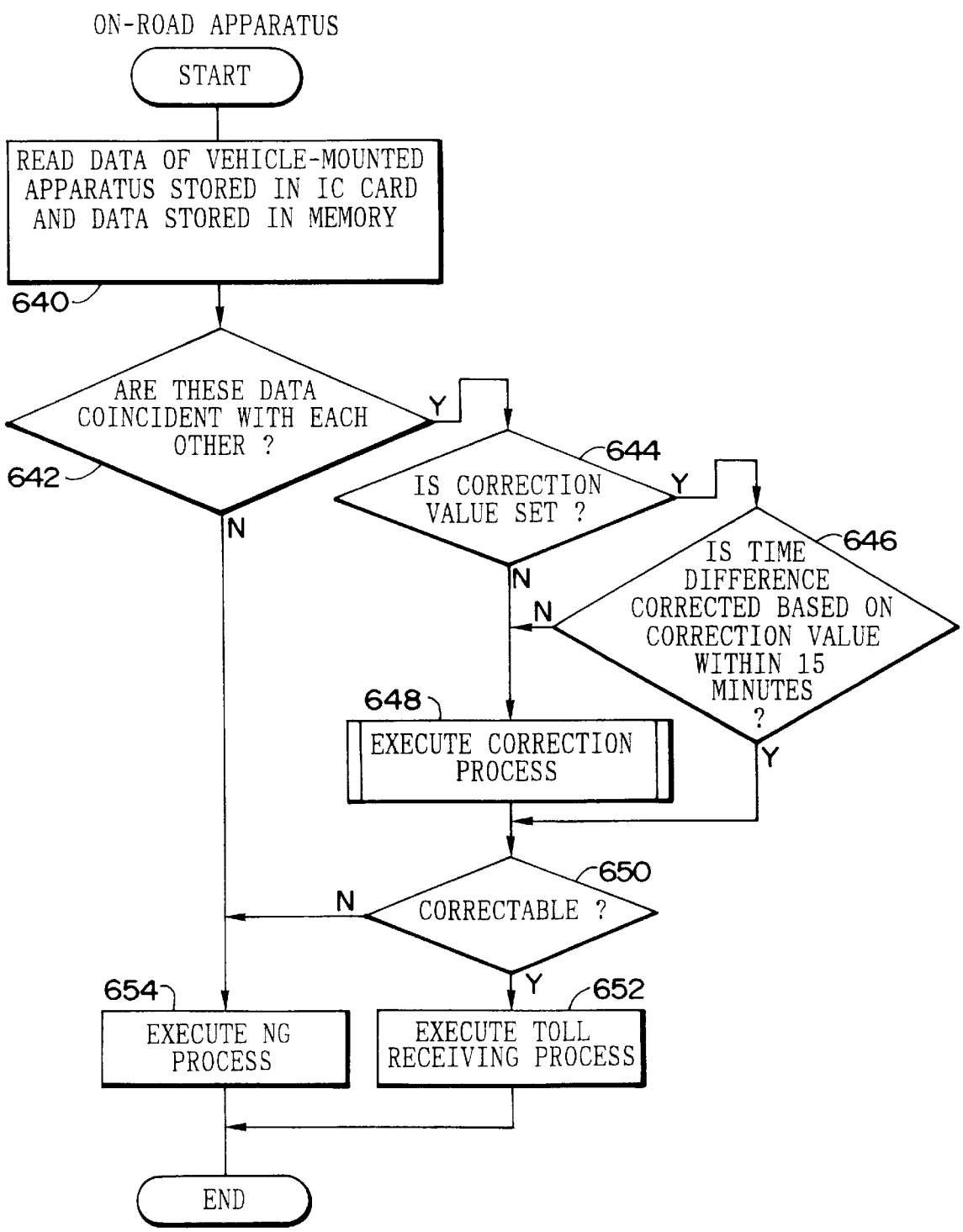
FIG. 12 is a flowchart for describing a relief process routine.
Figure 13:
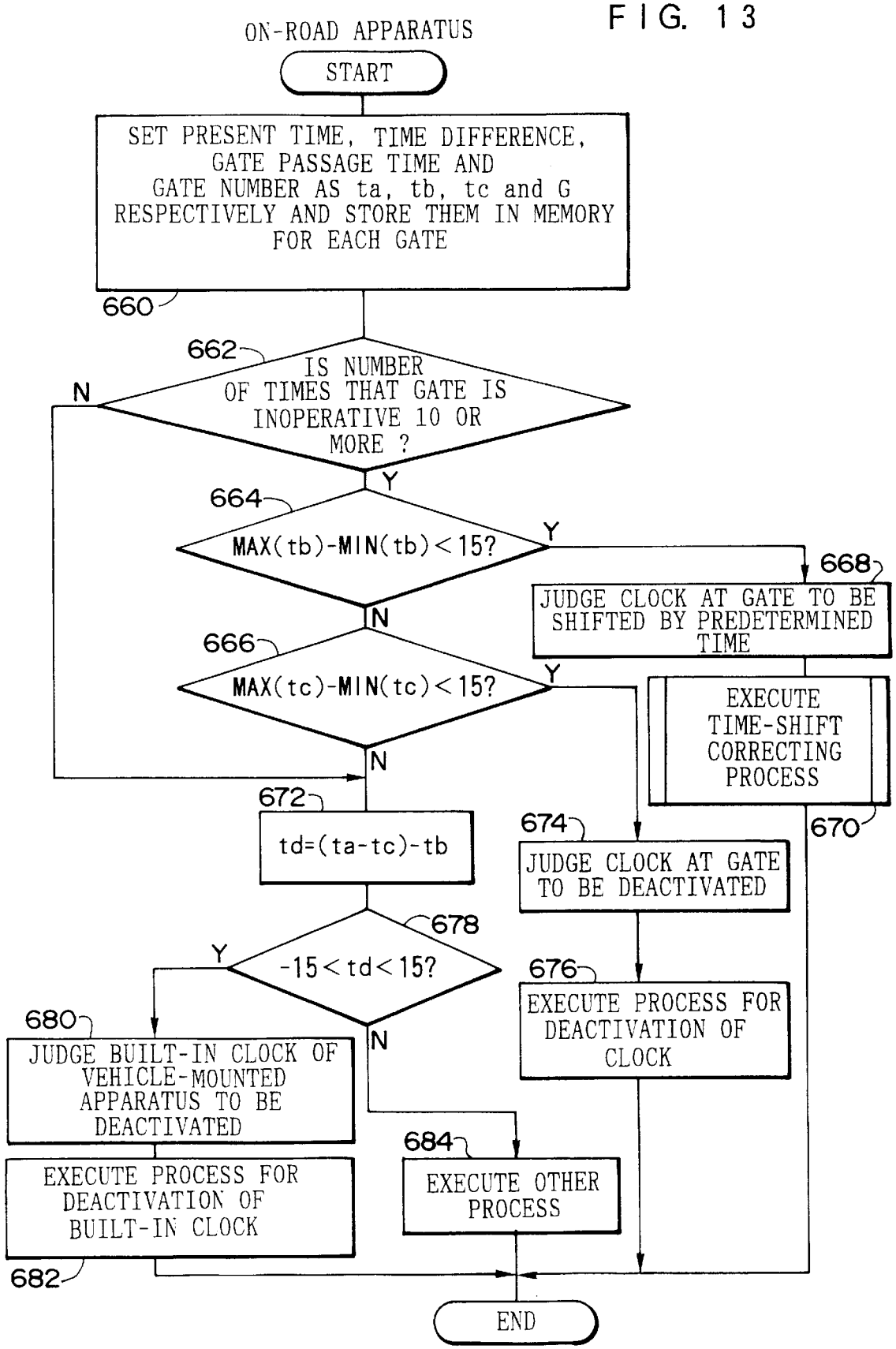
FIG. 13 is a flowchart for describing a correcting process routine.
Figure 15:
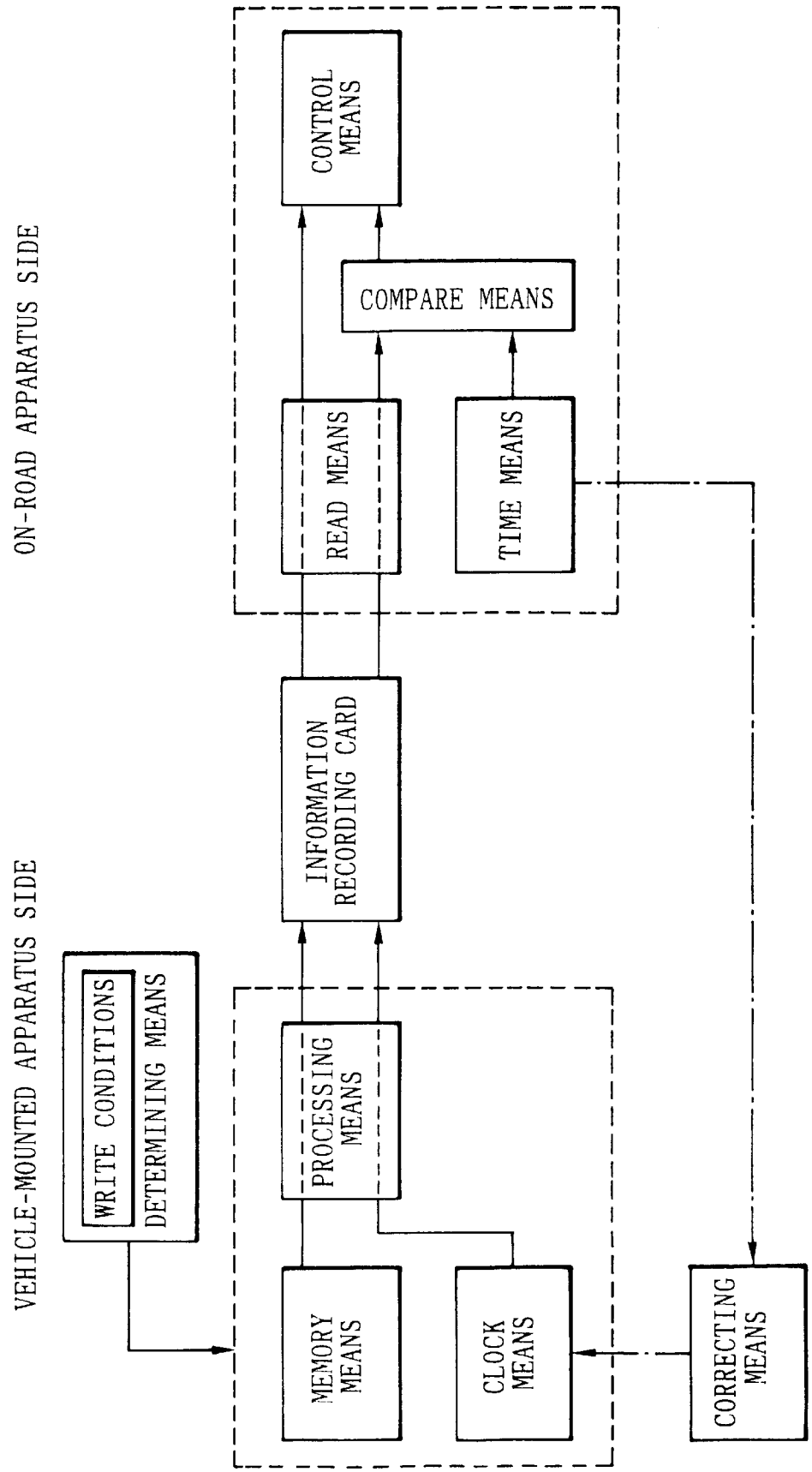
FIG. 15 is a view showing a principal configuration of the present invention.

Step 648 shown in FIG. 12 will next be described in detail. In Step 660 shown in FIG. 13, the present time corresponding to the reference time of the on-road apparatus is represented as ta, the time difference (Step 616 in FIG. 9) is represented as tb, the time (a gate passage time) when the vehicle passes through a gate regarded as a failure object is represented as tc and a number of the gate is represented as G. Further, they are stored for each gate. Since the time of the built-in clock of the vehicle-mounted apparatus is synchronized with the reference time of the on-road apparatus, the gate regarded as the failure object shows a gate that the vehicle finally has passed therethrough. A reference time transmitted from the gate upon passage of the gate is stored in the IC card as the gate passage time tc. It is next judged in Step 662 whether the detected number of failure times that the gate regarded as the failure object, is greater than or equal to a predetermined number of times (10 in the present embodiment). If the answer is judged to be No in Step 662, then the routine procedure proceeds to Step 672 where a difference td between the difference between the gate passage time and the present time and the time difference is determined (i.e., td=(ta−tc)−tb). This difference td corresponds to time period of the built-in clock in the vehicle-mounted apparatus, which has been counted since the passage of the gate. Therefore, when the difference td falls within a predetermined time width (±15 minutes in the present embodiment), the routine procedure proceeds to Step 680 where the built-in clock of the vehicle-mounted apparatus is judged as deactivated. In the next Step 682, a corresponding process for notifying NG of the built-in clock to an operator in a manned gate by a display or the like is executed. Thus, the operator in the manned gate can urge a vehicle occupant to consider the need of repairs for the improper built-in clock. When the difference td exceeds the predetermined time width, it can be estimated that the vehicle-mounted apparatus is malfunctioning. Therefore, the possibility of NG of the vehicle-mounted apparatus is notified to the operator in the manned gate through the display or the like as other process in Step 684.

When the detected number of times that the gate has been regarded as the failure object, is greater than or equal to the predetermined number of times (Step 662), it is judged in Step 664 whether the difference between the maximum and minimum values of the time difference stored with regard to the gate is less than a predetermined value (15 minutes in the present embodiment) (i.e., MAX(tb)−MIN(tb)<15). If the answer is found to be Yes in Step 664, then it can be presumed that time information is written into the vehicle that has passed through the gate, with a time shifted by a predetermined time as the reference. Further, it can be presumed that the built-in clock is corrected based on the shifted time. It is therefore judged in Step 668 that the reference clock at the gate is shifted by the predetermined time. In the next Step 670, a time-shift correcting process is executed. The shift correcting process is executed in the following manner. Namely, the average or mean value of time shifts is determined in Step 690 shown in FIG. 14. In the next Step 692, the resultant mean value is stored as a correction value. Accordingly, when the time difference stored with regard to the gate, which corresponds to the stored correction value, is read from the IC card, the correction value is added to the read time difference, whereby it can be judged on the basis of the time in which the time shift at the gate has been resolved, whether a toll can be received.

Next, when the answer is found to be negative in Step 664 and the reference clock at the gate is found not to have the shift of the predetermined time, the routine procedure proceeds to Step 666 where it is judged whether the difference between the maximum and minimum values of the gate passage time stored with regard to the gate is less than the predetermined value (15 minutes in the present embodiment) (i.e., MAX(tc)−MIN(tc)<15). If it is judged in Step 666 that the difference is less than the predetermined value, then a variation in time at the gate is too small. Therefore, the reference clock at the gate is judged to have been deactivated in Step 674. In the next Step 676, a process corresponding to the stop of the reference clock is executed. The process in Step 674, for example, notifies a gate number G and NG of the reference clock at a gate G to an operator in a manned gate by a display or the like. Thus, the operator in the manned gate can notify to a vehicle occupant that the reference clock of the on-road apparatus malfunctions and it is necessary for the occupant to pay a toll by hand. Further, since the operator is informed that the reference clock at the gate G is NG, the clock on the on-road apparatus side can be promptly repaired.

Thus, even when the difference between the reference time on the on-road apparatus side and the time information recorded in the IC card at the vehicle-mounted apparatus exceeds the predetermined time and it is judged that the data recorded in the IC card is invalid, the validity of the data written into the IC card can be determined by recording the failure flag in the IC card and comparing the previous data with the re-written data according to the presence or absence of the failure flag, thus it is possible to suitably cope with the case in which the built-in clock and the reference clock malfunction.

Even if the reference clock on the on-road apparatus side is shifted by the predetermined time, such a shift in time can be corrected by the above-described statistical process. Therefore, the reference clocks of all the on-road apparatuses can be handled without being synchronized with one another. Further, since defective on-road apparatuses such as a gate having a clock shifted by a predetermined time, a gate having a deactivated clock, etc. can be found at an early stage, the clocks can be promptly repaired.

According to the vehicle-mounted apparatus suitable for use in road-to-vehicle communications, as has been described above, an advantageous effect can be brought about in that since the data and the time information are recorded together in the information recording card, the transfer of the data between the vehicle-mounted apparatus and the on-road apparatus can be easily made without both apparatuses being directly connected to each other, and the reliability of the data can be improved based on the time information.

Further, according to the road-to-vehicle communication system of the present invention, an advantageous effect can be achieved since the data and the time information are read out from the information recording card by the reading means, the transfer of data between the vehicle-mounted apparatus and the on-road apparatus can be easily performed without both apparatuses being directly connected to each other, since the process for comparing the present time counted on the on-road apparatus side with the time at the time of recording of data and receiving the toll when the time difference between the two falls within the predetermined value, is executed, the toll receiving process can be executed based on the latest data without the reception of the toll based on the previous data in terms of the time.

Further, in the vehicle-mounted apparatus for road-to-vehicle communications, an advantageous effect can be achieved if the present time of the clock means of the vehicle-mounted apparatus is corrected to coincide with the present time of the on-road apparatus, which has been read through the radio communications. The difference between the present time on the on-road apparatus side and the present time on the vehicle-mounted apparatus side can be controlled and the reliability for judging the timing of data from the read time information can be improved.

While the embodiments of the present invention, as herein disclosed, constitute a preferred form, it is to be understood that other forms might be adopted.

What is claimed is:

1. A vehicle-mounted apparatus suitable for use in road-to-vehicle communications, comprising:

clock means for counting a present time;

memory means for storing therein data about communications made between said vehicle-mounted apparatus and an apparatus installed on a road;

means for determining whether a present state of a vehicle is includes in predetermined write conditions wherein said predetermined write conditions are indicative of states which require writing of said data into an information recording card having a storage area for storing at least said data therein; and processing means for reading said data stored in said memory means and writing said data into the storage area of said information recording card, and reading the present time counted by said clock means and writing the present time into the storage area of said information recording card as time information, when the present state is included in said write conditions.

2. A road-to-vehicle communication system for transferring information by radio communications between each said apparatus installed on a road and the vehicle-mounted apparatus as defined in claim 1, said each on-road apparatus comprising:

time means for counting a present time;

means for reading the data and time information which have been written into the information recording card;

means for comparing the read time information with the present time counted by said time means; and control means for executing a toll receiving process based on the read data when a time difference corresponding to the result of comparison by said compare means falls within a predetermined value.

3. A vehicle-mounted apparatus suitable for use in road-to-vehicle communications according to claim 1, further comprising time information correcting means for reading a present time of said on-road apparatus by radio communications and correcting the present time of said clock means so as to coincide with a present time of said on-road apparatus.

* * * * *